(12) United States Patent
Kong et al.

(10) Patent No.: US 11,028,529 B2
(45) Date of Patent: Jun. 8, 2021

(54) METHOD FOR ACTIVELY DECREASING THE TEMPERATURE OF A HEATABLE SOLEPLATE IN A TEXTILE TREATMENT DEVICE

(71) Applicant: KONINKLIJKE PHILIPS N.V., Eindhoven (NL)

(72) Inventors: Xin Xian Kong, Singapore (SG); Frederik Jan De Bruijn, Eindhoven (NL); Binyam Gebrekidan Gebre, Rosmalen (NL); Yen Leng Pang, Singapore (SG); Kenny Khng, Singapore (SG); Karl Catharina Van Bree, Eindhoven (NL); Boon Teck Tan, Singapore (SG); Victor Martinus Gerardus Van Acht, Veldhoven (NL); Yong Jiang, Singapore (SG); Hee Poh Sin, Singapore (SG); Mohankumar Valiyambath Krishnan, Singapore (SG); Orhan Kahya, Groningen (NL); Aditya Mehendale, Geldrop (NL); Harold Agnes Wilhelmus Schmeitz, Eindhoven (NL); Dmitry Nikolayevich Znamenskiy, Eindhoven (NL); Antonius Johannes Joseph Wismans, Sevenum (NL); Sergio Consoli, Nuenen (NL); Petra Bijl, Eindhoven (NL); Arnoldus Johannes Martinus Jozeph Ras, Mierlo (NL); Yao Hean Chiah, Woodlands (SG)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/485,472

(22) PCT Filed: Dec. 21, 2018

(86) PCT No.: PCT/EP2018/086450
§ 371 (c)(1),
(2) Date: Aug. 13, 2019

(87) PCT Pub. No.: WO2019/122275
PCT Pub. Date: Jun. 27, 2019

(65) Prior Publication Data
US 2020/0378056 A1    Dec. 3, 2020

(30) Foreign Application Priority Data
Dec. 22, 2017    (EP) .................................... 17210086

(51) Int. Cl.
*D06F 75/26*    (2006.01)
*D06F 75/14*    (2006.01)
(Continued)

(52) U.S. Cl.
CPC .............. *D06F 75/26* (2013.01); *D06F 34/18* (2020.02); *D06F 75/12* (2013.01); *D06F 75/14* (2013.01);
(Continued)

(58) Field of Classification Search
CPC ..... D06F 75/00–38; D06F 87/00; H05B 1/02; G05B 19/4155; G05B 2219/45196;
(Continued)

(56) References Cited

U.S. PATENT DOCUMENTS 3,002,302 A * 10/1961 Flowers .................. D06F 75/18
38/77.5
3,869,815 A *  3/1975 Bullock .................. D06F 73/02
38/77.6
(Continued)

FOREIGN PATENT DOCUMENTS

CN    104762801    7/2015
CN    105046917    11/2015
(Continued)

OTHER PUBLICATIONS

International Search Report and Written Opinion dated Feb. 12, 2019 for Nternational Application No. PCT/EP2018/086450 Filed Dec. 21, 2018.

(Continued)

*Primary Examiner* — Ismael Izaguirre

(57) ABSTRACT

The invention relates to a method of operating a textile treatment device comprising a heatable soleplate intended to be in contact with a textile for treating the textile. The method comprises a first step (1001) of setting a first temperature target for the heatable soleplate, and a step (1002) of detecting movement of said textile treatment device. If the step (1002) of 5 detecting movement did not detect any movement of said textile treatment device during more than a given first time duration, a step (1004) of actively decreasing the temperature of the heatable soleplate (4) up to reaching a first given temperature having a value below said first temperature target.

20 Claims, 23 Drawing Sheets

(51) Int. Cl.

| | |
|---|---|
| *D06F 75/22* | (2006.01) |
| *G06N 3/04* | (2006.01) |
| *G06N 3/08* | (2006.01) |
| *D06F 87/00* | (2006.01) |
| *G05B 13/02* | (2006.01) |
| *G06K 9/62* | (2006.01) |
| *H04N 5/225* | (2006.01) |
| *G05B 19/4155* | (2006.01) |
| *D06F 34/18* | (2020.01) |
| *D06F 75/12* | (2006.01) |
| *G06K 9/20* | (2006.01) |
| *D06F 75/38* | (2006.01) |
| *D06F 103/06* | (2020.01) |

(52) U.S. Cl.

CPC .............. *D06F 75/22* (2013.01); *D06F 87/00* (2013.01); *G05B 13/027* (2013.01); *G05B 19/4155* (2013.01); *G06K 9/209* (2013.01); *G06K 9/2027* (2013.01); *G06K 9/6253* (2013.01); *G06K 9/6267* (2013.01); *G06N 3/04* (2013.01); *G06N 3/08* (2013.01); *H04N 5/2253* (2013.01); *D06F 75/38* (2013.01); *D06F 2103/06* (2020.02); *G05B 2219/45196* (2013.01)

(58) Field of Classification Search

CPC ........ G05B 2219/45195; G05B 13/027; G06K 9/6267; G06N 3/04; G06N 3/08; H04N 5/2253

See application file for complete search history.

(56) References Cited

U.S. PATENT DOCUMENTS

| | | | | |
|---|---|---|---|---|
| 5,042,179 A | * | 8/1991 | van der Meer | G05D 23/1934 38/77.83 |
| 5,642,578 A | * | 7/1997 | Hazan | D06F 75/26 38/77.7 |
| 5,719,379 A | * | 2/1998 | Huang | D06F 75/26 219/252 |
| 5,818,011 A | * | 10/1998 | Ito | D06F 75/26 219/257 |
| 6,079,133 A | * | 6/2000 | Netten | D06F 75/18 38/77.7 |
| 8,618,448 B2 | * | 12/2013 | Alexander | A47J 39/025 219/432 |
| 2001/0049846 A1 | | 12/2001 | Guzzi | |
| 2006/0076341 A1 | | 4/2006 | Lozinski | |
| 2006/0086712 A1 | | 4/2006 | Feldmeier | |
| 2008/0189991 A1 | * | 8/2008 | Cavada | D06F 75/246 38/75 |
| 2008/0189993 A1 | * | 8/2008 | Cavada | D06F 75/38 38/82 |
| 2011/0056509 A1 | * | 3/2011 | Benest | F25B 21/02 132/223 |
| 2012/0227758 A1 | * | 9/2012 | Ford | A45D 1/04 132/211 |
| 2016/0145794 A1 | | 5/2016 | Janakiraman | |
| 2016/0319477 A1 | | 11/2016 | Janakiraman | |
| 2017/0167072 A1 | * | 6/2017 | Wong | D06F 75/16 |

FOREIGN PATENT DOCUMENTS

| | | |
|---|---|---|
| CN | 106283584 | 1/2017 |
| DE | 102007062879 | 7/2009 |
| JP | H0576700 | 3/1993 |
| JP | 2000225300 | 8/2000 |
| WO | 96/23099 | 8/1996 |
| WO | 2004/009898 | 1/2004 |
| WO | WO 2009083417 A1 * | 7/2009 |
| WO | 2012/085746 | 6/2012 |

OTHER PUBLICATIONS

LeCun, et al: "Gradient-based learning applied to document recognition", Proceedings of the IEEE, 86(11): 2278-2324, Nov. 1998.
Kalliatakis, et al: "Evaluating Deep Convolutional Neural Networks for Material Classification" Nov. 2016.

* cited by examiner

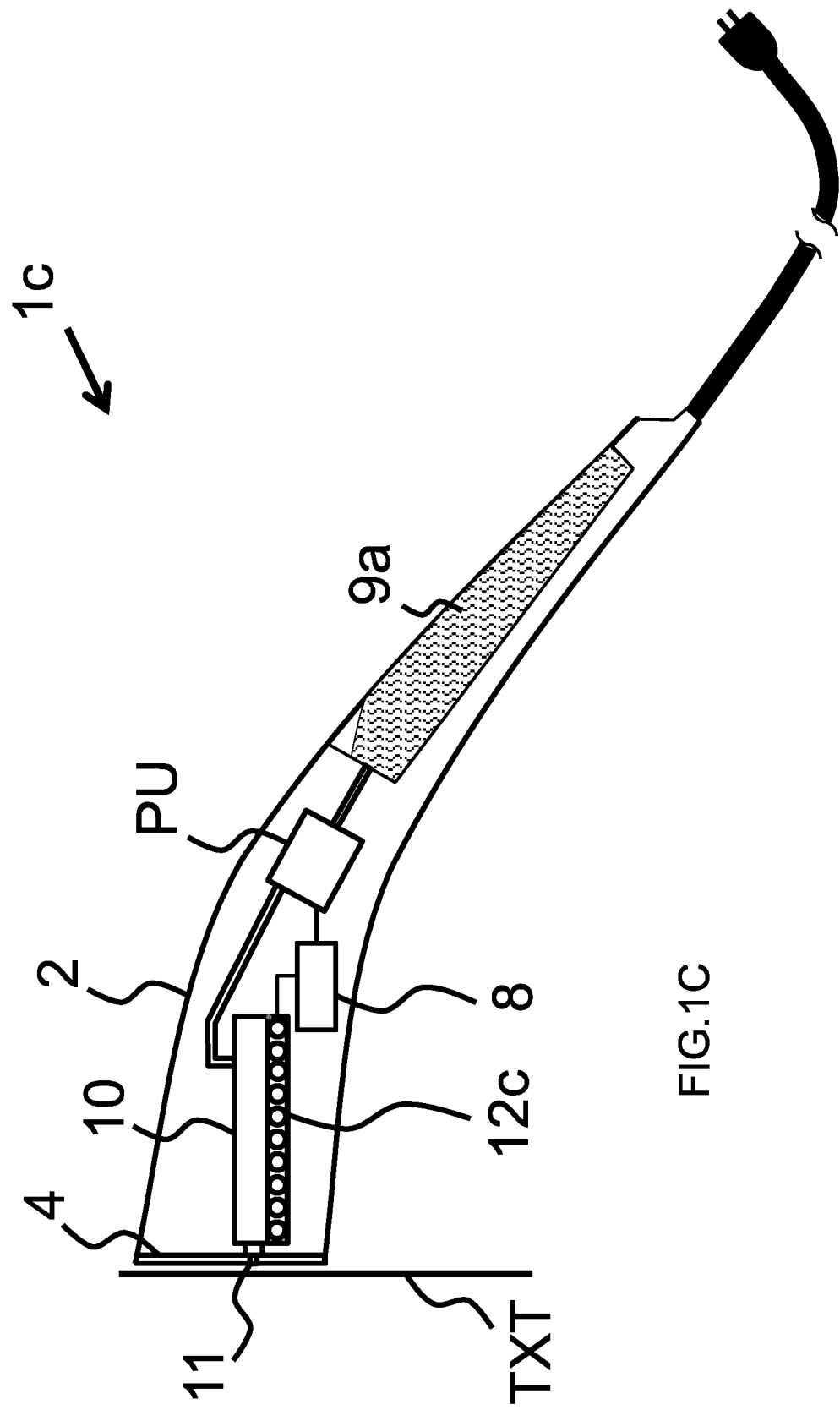

METHOD FOR ACTIVELY DECREASING THE TEMPERATURE OF A HEATABLE SOLEPLATE IN A TEXTILE TREATMENT DEVICE

CROSS REFERENCE TO RELATED APPLICATIONS

This application is the U.S. National Phase application under 35 U.S.C. § 371 of International Application No. PCT/EP2018/086450 filed Dec. 21, 2018, published as WO 2019/122275 on Jun. 27, 2019, which claims the benefit of European Patent Application Number 17210086.9 filed Dec. 22, 2017. These applications are hereby incorporated by reference herein.

FIELD OF THE INVENTION

The invention relates to the field of garment care, in particular to a method of operating a textile treatment device.

BACKGROUND OF THE INVENTION

It is known that ironing devices are provided with temperature sensors. The temperature sensors are used to control operation of the ironing device and to avoid damaging the textile (of the garments) due to inappropriate operating parameters. If the user uses the ironing device for treating different textiles, it is necessary for the user to manually adjust at least one setting, in particular the temperature of the soleplate of the ironing device, in order to achieve efficient treatment of the textile.

However, the soleplate temperature selected by user implies that the ironing device is in normal use by the user, in other words that the ironing device is in movement with respect to the textile (of the garments) being ironed.

In case the ironing device is no more in movement with respect to the textile (of the garments) being ironed, which could for example be caused by the user being suddenly called on the phone, there is a risk that the textile (of the garments) will get damaged due to a prolonged time duration of no movement of the ironing device on the textile (of the garments).

OBJECT AND SUMMARY OF THE INVENTION

It is an object of the invention to propose an improved method and textile treatment device that avoids or mitigates the above-mentioned problems.

The invention is defined by the independent claims. The dependent claims define advantageous embodiments.

To this end, the invention proposes a method of operating a textile treatment device comprising a heatable soleplate intended to be in contact with a textile for treating the textile.

The method comprises:
a first step of setting a first temperature target for the heatable soleplate,
a step of detecting movement of said textile treatment device,
If the step of detecting movement did not detect any movement of said textile treatment device during more than a given first time duration, the method according to the invention performs a step of actively decreasing the temperature of the heatable soleplate up to reaching a first given temperature having a value below said first temperature target.

The invention also relates to a textile treatment device for treating a textile. The textile treatment device comprises:
a heatable soleplate intended to be in contact with the textile for treating the textile,
a motion sensor for detecting movement of said textile treatment device,
means for actively decreasing the temperature of the heatable soleplate,
a control unit for triggering said means for actively decreasing the temperature of the heatable soleplate if the motion sensor did not detect any movement of said textile treatment device during more than a given first time duration, for actively decreasing the temperature of the heatable soleplate up to reaching a first given temperature having a value below said first temperature target.

The invention also relates to a computer program product taking the form of an executable file, or an executable library, or a downloadable mobile application for mobile phone and/or smartphone, the computer program product containing instruction codes for implementing the method described above.

Detailed explanations and other aspects of the invention will be given below.

BRIEF DESCRIPTION OF THE DRAWINGS

Particular aspects of the invention will now be explained with reference to the embodiments described hereinafter and considered in connection with the accompanying drawings, in which identical parts or sub-steps are designated in the same manner;

FIG. 1C schematically illustrates a textile treatment device according to a fourth exemplary embodiment of the invention;

DETAILED DESCRIPTION OF THE INVENTION

Figure 1:
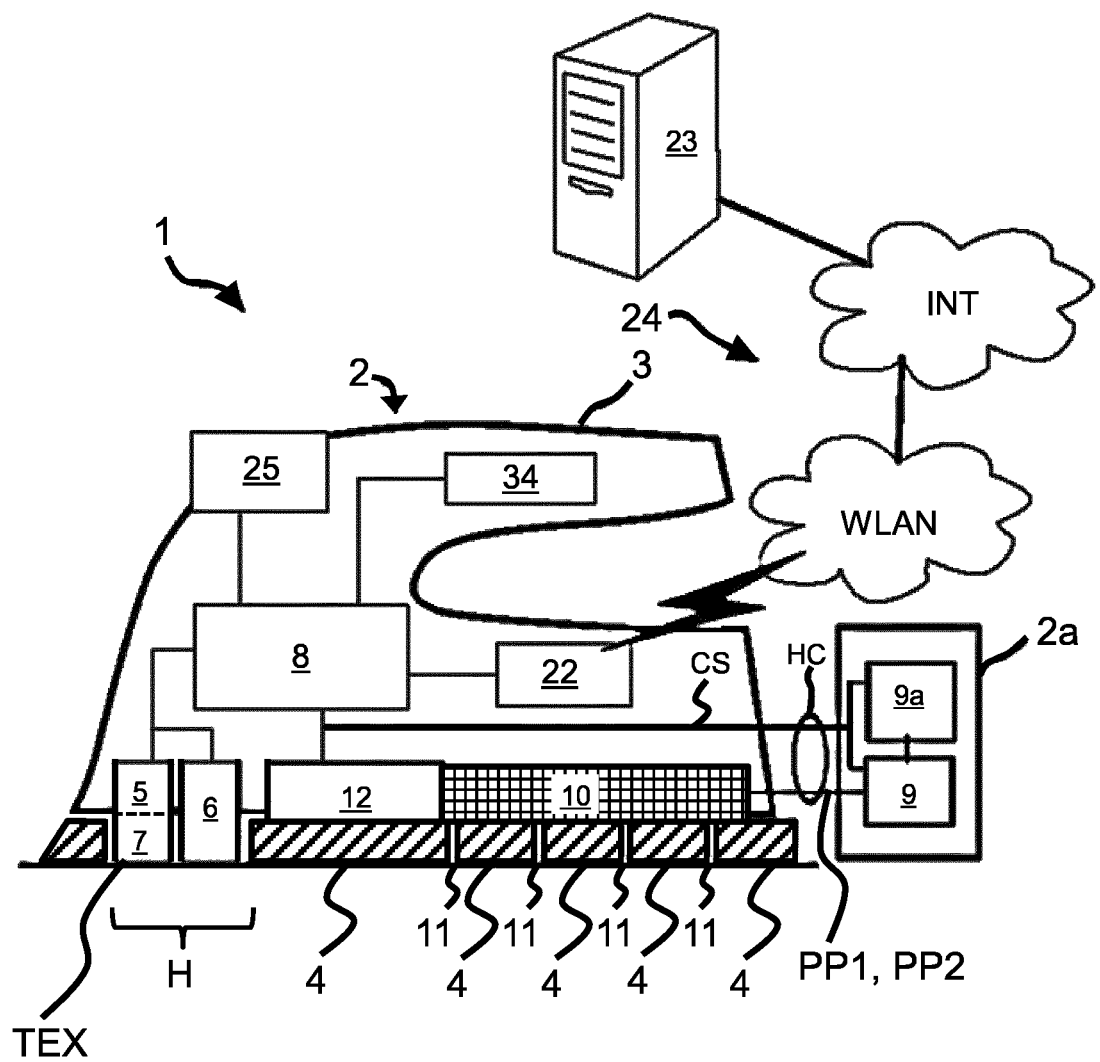
FIG. 1 schematically illustrates a textile treatment device according to a first exemplary embodiment of the invention.

FIG. 1 illustrates a textile treatment device 1 according to a first exemplary embodiment.

The textile treatment device 1 corresponds to a pressurized steam ironing system with boiler in the base 2a.

The textile treatment device 1 comprises a handheld ironing device having a first casing 2. The first casing 2 includes a handle 3 for the user to hold the textile treatment device 1. The handheld ironing device is a portable device which is portable by a single user treating the textile (TEX).

The textile treatment device 1 also includes a second casing 2a in which is arranged a steam generator 9 of the "boiler" type. A water supply 9a is also arranged in the second casing 2a for supplying water to the steam generator 9.

The textile treatment device 1 further includes a control unit 8 integrated within the portable textile treatment device. This integration allows that all necessary control and signal processing is done on the textile treatment device itself, without any need to interact with external devices or use external computation resources.

Preferably, the control unit 8 is in signal communication with the water supply 9a and the steam generator 9 via control signal CS. For example, the water supply 9a corresponds to a water tank at the exit of which an output valve or a pump (shown as P1 in FIGS. 9A to 9D) is controllable by the control unit 8 via signal CS.

The first casing 2 and the second casing 2a communicate via a (flexible) hose cord HC.

The hose cord HC comprises a first pipe PP1 for carrying steam from the steam generator 9 to the steam chamber 10.

The hose cord HC also comprises a second pipe PP2 for carrying water from the water supply 9a to the steam chamber 10, for example via an output valve or a pump (shown as P2 in FIGS. 9A to 9D) which is controllable by signal CS of the control unit 8, as it will be further described in the following.

The first pipe PP1 and the second pipe PP2 are preferably connected to two different inlets of the steam chamber 10, as illustrated.

The first casing 2 comprises a steam chamber 10 adapted to receive steam from the steam generator 9. The first casing 2 also comprises a heatable soleplate 4 comprising steam vents 11. Through the steam vents 11, the steam is supplied from the steam chamber 10 to the textile TXT under treatment. The steam chamber 10 is in thermal contact with a heating system 12. The heating system 12 is intended to heat the heatable soleplate 4, and to heat the steam chamber 10 so that steam received from the steam generator 9 does not condensate. The heating system 12, the heatable soleplate 4, and the steam chamber 10 are in thermal contact. The heating system 12 is controlled by the control unit 8 in order to vary the thermal energy supplied by the heating system 12. By way of example, the heating system 12 includes at least one resistive heating element (not shown) which are in heat transfer communication with the heatable soleplate 4 being intended to contact the textile under during treatment.

When treating the textile (TEX), the user moves the textile treatment device over the textile to be treated while a heatable soleplate 4 of the textile treatment device 1 is in planar contact with the textile. Additionally or alternatively, it is conceivable that the textile treatment device is be configured as a garment steamer.

The textile treatment device 1 includes an image sensor 5 for taking an image of the textile to be treated.

By way of example, the image sensor 5 is arranged such as looking in a through-hole or in a through-recess H of the heatable soleplate 4. In that case, the image sensor 5 can be arranged either inside the thickness of the heatable soleplate 4, or arranged above the heatable soleplate 4. The through-hole/through-recess H can for example be arranged at a front part of the heatable soleplate.

This allows acquisition of an image of the textile by the image sensor 5, while the heatable soleplate 4 is in planar contact with the textile.

Figure 5:
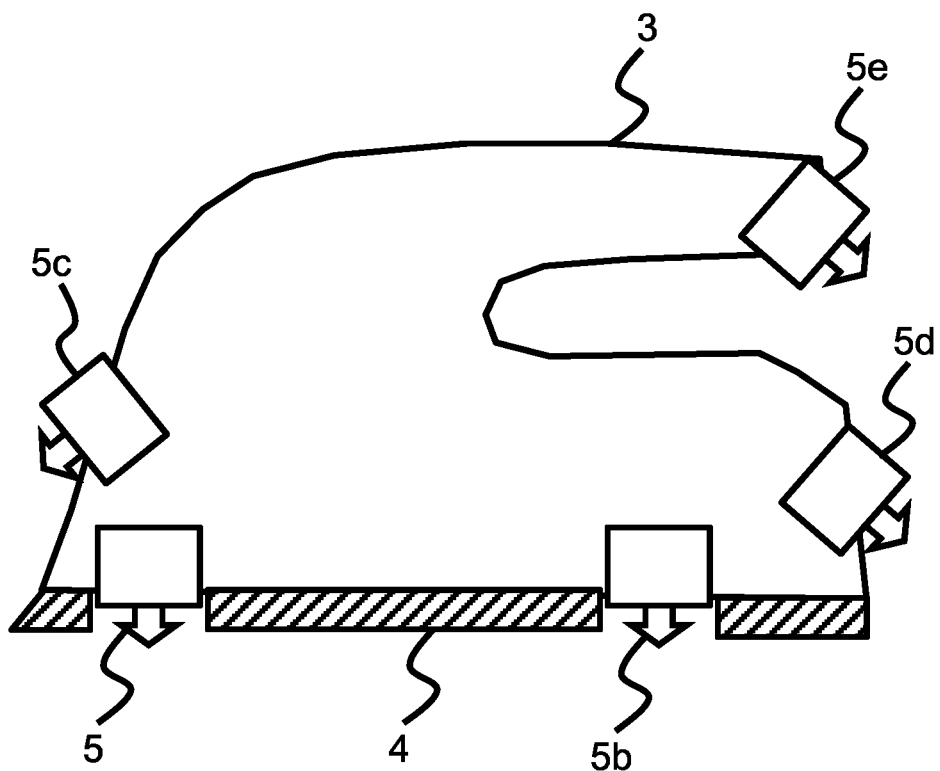
FIG. 5 illustrates various implementation of an image sensor in a textile treatment device according to the invention.

However, it is also possible that the image sensor is arranged at different locations in cooperation with the textile treatment device 1, such as:
- arranged at a rear part of the soleplate, as the image sensor 5b illustrated in FIG. 5,
- arranged at a front part of the textile treatment device 1, looking outside of the textile treatment device 1, as the image sensor 5c illustrated in FIG. 5,
- arranged at a rear part of the textile treatment device 1, such as a heel area of the textile treatment device 1, and looking outside of the textile treatment device 1, as the image sensor 5d illustrated in FIG. 5,
- arranged in cooperation with a handle 3 of the textile treatment device 1, as the image sensor 5e illustrated in FIG. 5.

Preferably, the image sensor has an active surface sensitive to light, which is oriented with respect to the surface of the heatable soleplate 4 being in contact with the textile, with an absolute value of an orientation angle a5 being in the range 0-85 degrees, preferably within 15-70 degrees. This is illustrated in FIG. 7 illustrating a zoomed-in view of a device according to the invention.

This orientation angle allows a more flexible implementation of the image sensor in the textile treatment device 1 in terms of resulting in a more compact space.

The textile treatment device 1 may include an optical system 7. The optical system has at least one optical element, such as lenses, mirrors and/or apertures and is configured to generate a focused image of a surface portion of the textile TEX on an active surface of the image sensor 5. However, it is also conceivable that the image sensor 5 receives light directly emitted from the textile, i.e. light which has not passed through an optical system.

Figure 7:
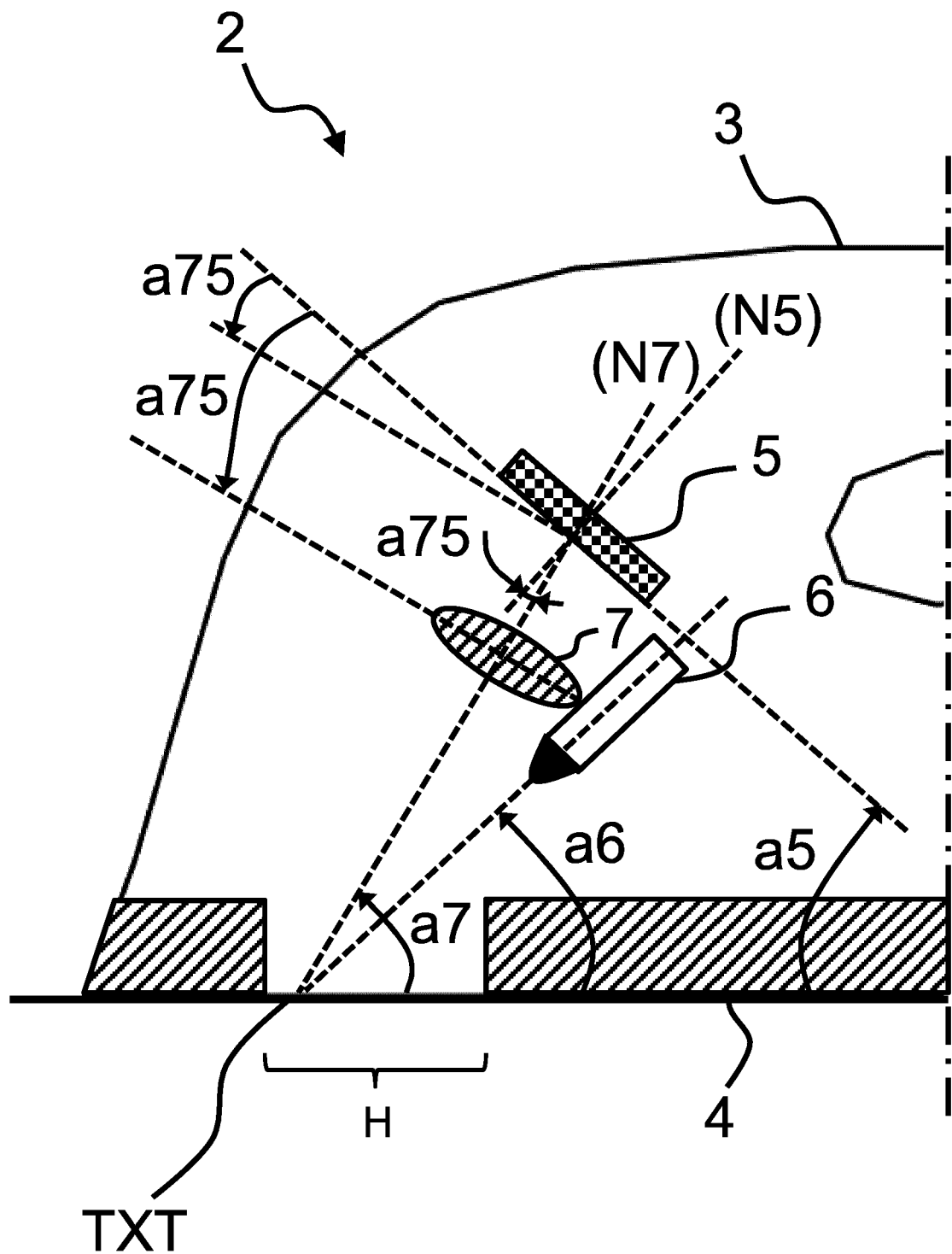
FIG. 7 depicts a first zoomed-in view of a device according to the invention.

As illustrated in FIG. 7, the optical system 7 comprises a first symmetrical axis N7 defining a first optical path between the surface portion of the textile TXT and the optical system 7. The first symmetrical axis N7 is perpendicular to the planar surface of the optical system 7.

Preferably, the first symmetrical axis N7 is inclined with an absolute angle a7 with respect to the surface of the heatable soleplate 4 being in contact with the textile. The orientation angle a7 is in the range 15-90 degrees.

The image sensor 5 (and similarly the image sensors 5b, 5c, 5d, 5e as illustrated in FIG. 5) comprises a second symmetrical axis N5 defining a second optical path between the optical system 7 and the image sensor. The second symmetrical axis N5 is perpendicular to the planar surface of the image sensor 5.

The first symmetrical axis N7 and the second symmetrical axis N5 forms an angle a75 less or equal than the maximum value of the angle a5 between the active surface sensitive to light of the image sensor and the surface of the heatable soleplate 4, so in the range] 0; 70] degrees.

By having a certain non-null angle value for a75, it can be made sure that the focus plane of the image sensor is exactly in the plane of the textile. That means that both "far away" as well as "close by" content in the image are in focus. Having an image in focus taken by the image sensor is advantageous for the convolutional neural network to obtain a more accurate classification of the fabric type.

The textile treatment device 1 further includes an illumination system 6 for illuminating a portion of the textile which is imaged using the image sensor 5.

The illumination system 6 may include a light source, such as a LED (light emitting diodes) and/or a laser beam.

The light source allows acquiring images under proper illumination conditions, thereby making textile classification more reliable.

Preferably, the light source of the illumination system 6 is oriented with respect to the surface of the heatable soleplate 4 being in contact with the textile, with an absolute value of an orientation angle a6 being in the range 0-85 degrees, preferably within 15-70 degrees. This is illustrated in FIG. 7.

This orientation angle a6 of the light source allows to capturing more details of the textile characteristics.

However, it is also conceivable that many of the technical effects and advantages described herein can still be obtained using a textile treatment device which has no illumination system 6.

When angle a7 is very close (or equal) to angle a6, a very "flat" image of the textile TXT is obtained, not much 'depth information' can be seen in the image, whereas when angle a7 is much different from angle a6, a lot of 'depth information' will be revealed in the image because of the shadows that are casted by the surface of the textile TXT. This depth information is advantageous for the convolutional neural network to obtain a more accurate classification of the fabric type.

The angles a7, a5, a75 verify the relation a7+a5−a75=90 degrees.

For example:
a7=65 degrees,
a5=35 degrees,
a75=10 degrees,
a6=49 degrees.

Preferably, the illumination system 6 comprises at least one light emitting diode arranged next to said first symmetrical axis N7.

Figure 8:
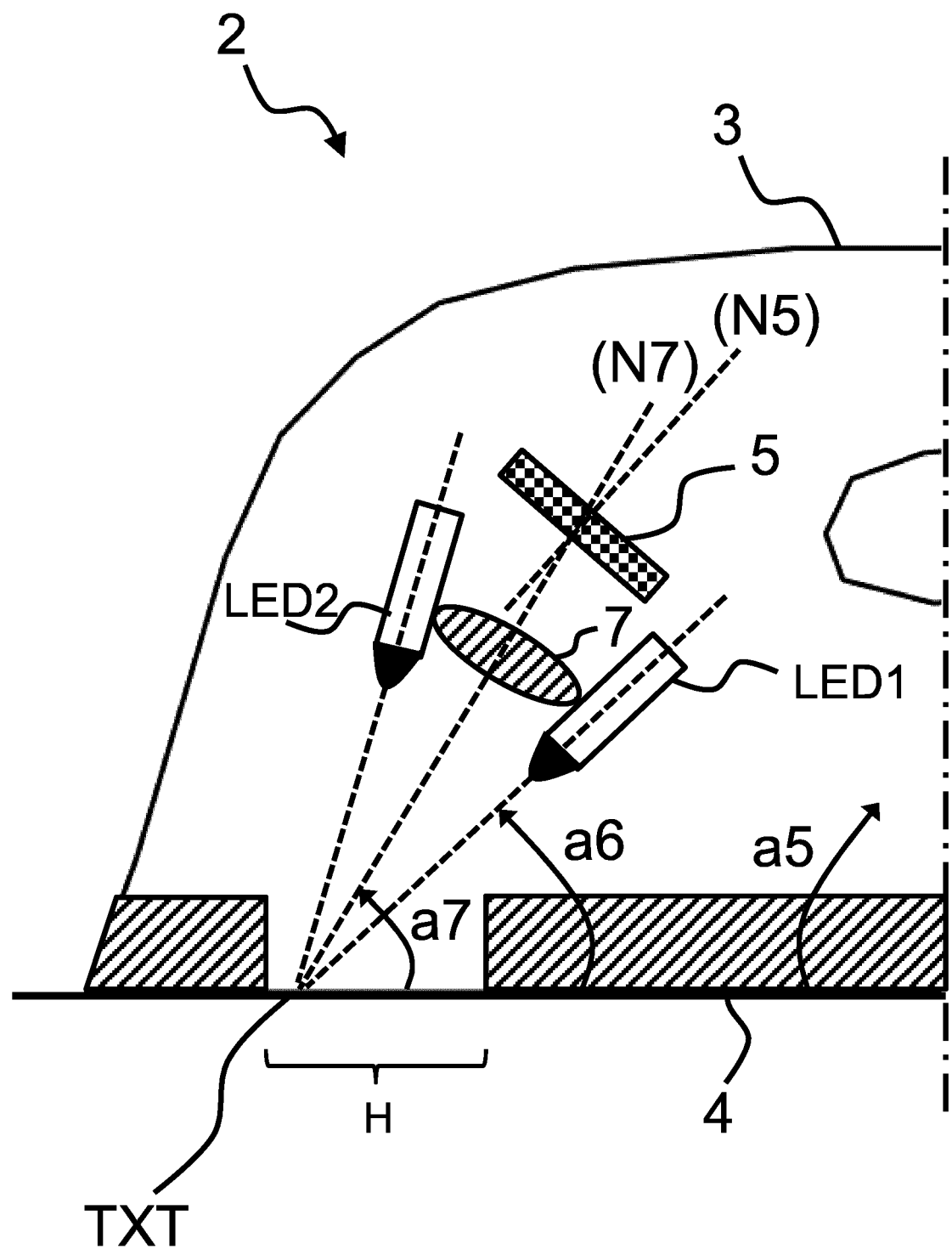
FIG. 8 depicts a second zoomed-in view of a device according to the invention.

For example, the at least one light emitting diode comprises two light emitting diodes (LED1, LED2) arranged symmetrically around the first symmetrical axis N7, as illustrated in FIG. 8.

In another example (not shown), the at least one light emitting diode comprises three light emitting diodes (LED1, LED2, LED3) arranged symmetrically around the first symmetrical axis N7. The three light emitting diodes (LED1, LED2, LED3) form a conical arrangement around the first symmetrical axis N7.

Preferably, the light emitting diodes are operated in pulsed operation by the control unit 8 to prevent motion blur and prevent rolling shutter effect. The light emitting diodes are given a very bright flash of light during approximately 30 microseconds, and then are off during approximately 30 milliseconds (1/1000 duty cycle). During the flash of light a current of approximately 1A flows through the LEDs. The average power dissipation per light emitting diode is approximately 0.001*1A*2.5V=2.5 mW.

Preferably, the illumination system 6 is adapted to generate a light beam in the Infrared (IR) wavelengths.

For example, light emitting diodes (LED1, LED2, LED3) emitting in the Infrared wavelengths can be used.

The reason to use Infrared light is because many fabric dies are transparent for infrared light. That means that a red textile and a blue textile and a white textile and a black textile all look exactly the same using infrared light. All textiles look as if they were white.

In the context of the invention, not being able to distinguish colors is not a problem, because the algorithm used according to the invention does not use color to obtain the classification of the textile. Indeed, color does not contain any information on fabric type (wool, silk, cotton): All fabric types can have all colors.

By using Infrared, because all the textiles look as having the same "color", it is thus not needed to change the exposure time or illumination intensity when going from one textile to the other. This simplifies the control of the illumination system 6, as well as contributes to faster image acquisition. And in the case the textile is woven with yarns that have different colors, in infrared light these colors all appear as white, so the fabric recognition algorithm is not disturbed by any 'print' on the textile.

The control unit 8 is in signal communication with the image sensor 5 and the illumination system 6. The control unit 8 is configured to execute an algorithm stored in the textile treatment device 1. The algorithm determines, using the taken image as an input of the algorithm, a classification of the textile.

The classification of the textile may include assigning at least one output classes to the textile.

This solution of obtaining a classification of the textile allows deriving suitable values for some operating parameters of the textile treatment device. Thereby, efficient treatment of the textile and reliable prevention of damage to the textile can be achieved.

The classes may be provided by or generated using output classes of an artificial neural network (ANN).

By way of example, the classes may be classes of a fabric type of the textile, or classes of a level of delicateness of the fabric for ironing the textile.

Those classifications are advantageous because they provide a sufficiently detailed level of classification, for controlling accordingly at least one operating parameter of the textile treatment device.

The classes of fabric type, such as material, may include classes, such as "wool", "nylon", "linen", "jeans" and "cotton".

The classes of fabric level of delicateness may include classes, such as "delicate" (including for example, but not limited to the list of material defined by acetate, elastane, polyamide, polypropylene, cupro, silk, polyester, triacetate, viscose, and wool) or "tough" (including for example, but not limited to the list of material defined by linen, jeans, cotton).

Delicate fabrics are considered fabrics that are sensitive to heat, and hence are usually recommended to be ironed with 1-dot and 2-dots settings, as per standard IEC 60311, while tough fabrics are considered to require higher temperature to obtain acceptable ironing results and are usually recommended to be ironed with 3-dots settings. However, it is noted that this is only a recommendation from standard IEC 60311, so not mandatory.

Below table extracted from standard IEC 60311 summarizes this correspondence:

| Marking | Sole-plate temperature T ° C. | Material, for example |
| --- | --- | --- |
| • (1 dot) | 70 < T < 120 | Acetate, elastane, polyamide, polypropylene |
| • • (2 dots) | 100 < T < 160 | Cupro, polyester, silk, triacetate, viscose, wool |
| • • • (3 dots) | 140 < T < 210 | Cotton, linen |

For example, a textile which is classified to the class "delicate" is treated using a relatively lower temperature of the heatable soleplate 4, for example in the range 70-160 degree Celsius.

For example, a textile which is assigned to the class "tough" is treated using a relatively higher temperature of the heatable soleplate 4, for example in the range 140-210 degree Celsius.

In the embodiment of FIG. 1, the control unit 8 is configured to control, based on the obtained classification of the textile, at least one operating parameter of the textile treatment device 1. The at least one operating parameter may include, but are not limited to:
- a temperature of the heatable soleplate 4 in the textile treatment device being intended to be in contact with the textile, and/or
- an amount of steam applied to the textile. The amount of steam applied to the textile can for example be varied by opening/closing a steam valve (shown as V1 and V2 in
FIGS. 9A to 9D) arranged at the exit of the steam generator 9, under the control of the control unit 8. The amount of steam applied to the textile can also be varied by varying the temperature of the steam generator 9, under the control of the control unit 8.

FIGS. 9A, 9B, 9C, 9D depict various zoomed-in views of a device as depicted in FIG. 1.

Figure 9A:
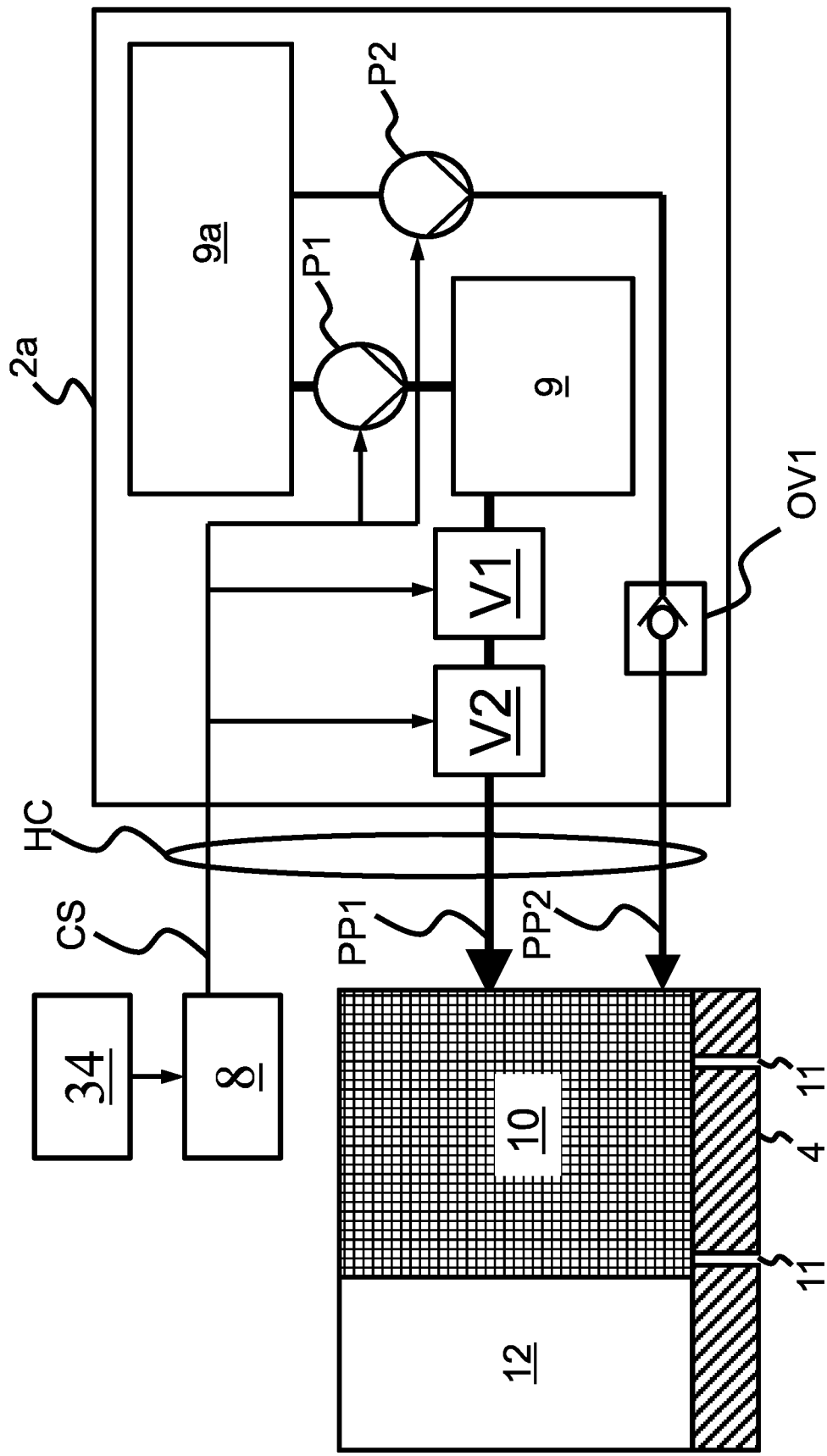
FIGS. 9A, 9B, 9C, 9D depict various zoomed-in views of a device as depicted in FIG. 1.

A first embodiment of this invention is as shown in FIG. 9A where two electro-valves V1 and V2 are connected in series along the first pipe PP1.

The valve V1 in this embodiment is a standard electro-valve with one open (ON) and one closed (OFF) position. The open/close states of the valves V1 and V2 are controlled by control signal CS from the control unit 8.

The valve V2 in this embodiment is a customized electro-valve which does not have a real closed position. For valve V2, it has a large diameter (for example 4 mm) when being in open (ON) position, and a small diameter orifice (for example 2 mm) when being in closed (OFF) position.

The valve V1 controls steam on/off (release steam/not release steam), while valve V2 controls high (when ON) steam rate and low steam rate when OFF.

The different combinations and the resultant steam rates at the exit of the first pipe PP1 are listed in the below table 1:

TABLE 1

|  |  | V1 State (Controls release of steam) | |
| --- | --- | --- | --- |
|  |  | On (Open) | Off (Close) |
| V2 State (Controls steam rate) | On (Open - large orifice) | High Steam | No Steam |
|  | Off (Close - small orifice) | Low Steam | No Steam |

In this embodiment, the valve V2 in open (ON) position preferably has a orifice diameter larger than valve V1 orifice diameter in open (NO) position. For example, valve V2 has orifice diameter of 4 mm when being in open (ON) position, and valve V1 has orifice diameter of 3 mm when being in open (ON) position. This is for the purpose of minimizing losses caused by valve V1.

In this embodiment, the order of valve V1 (control release of steam) and valve V2 (controls steam rate) can also be exchanged to produce similar results.

Figure 9B:
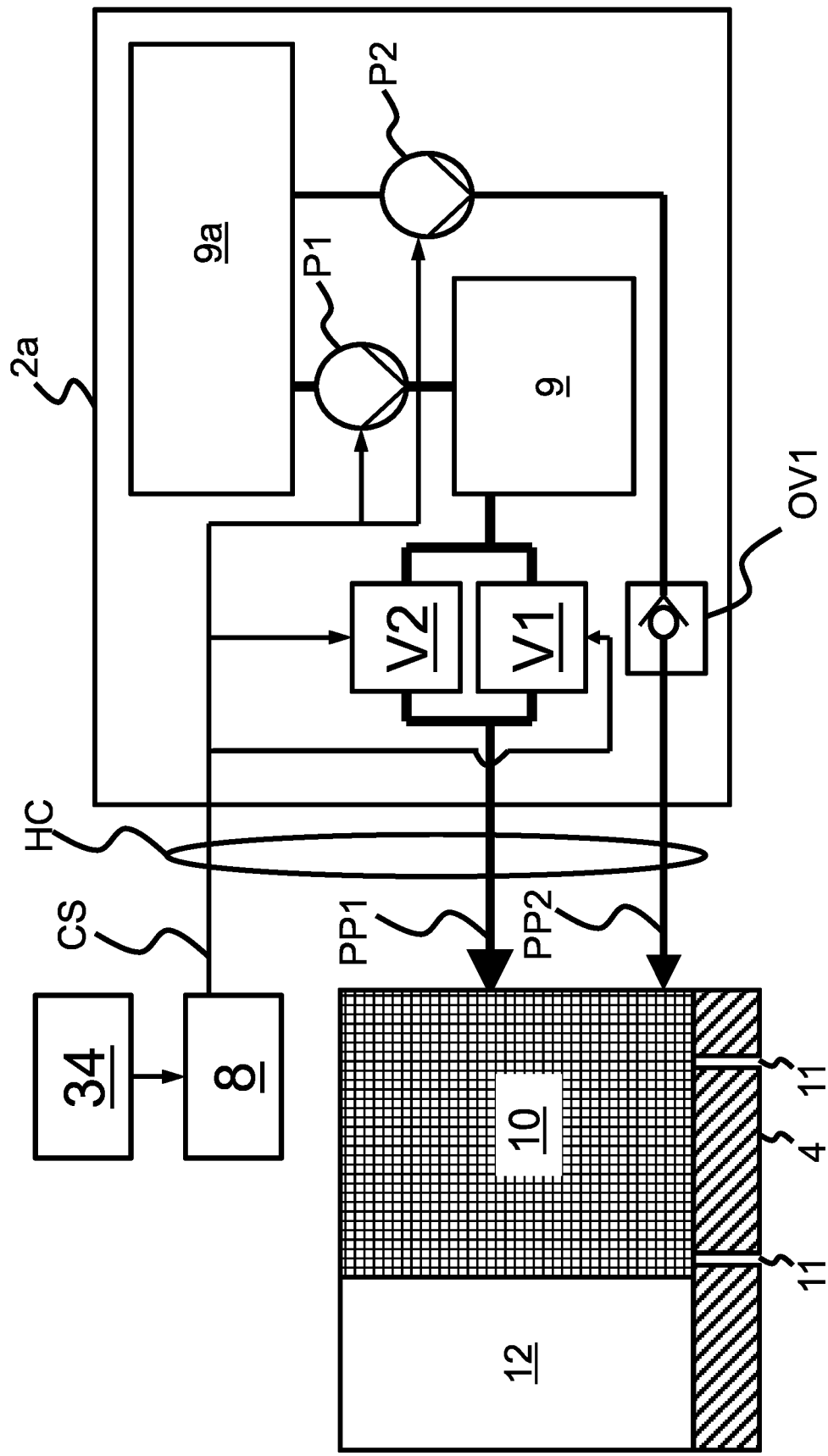

The second embodiment of this invention is as shown in FIG. 9B, where two electro-valves (V1 and V2) are connected in parallel. Valves V1 and V2 in this embodiment can have the same orifice diameter or different orifice diameters depending on the requirements of the application.

Different steam rates at the exit of the first pipe PP1 can be obtained using a combination of E-valve states. This is shown in the below table 2:

TABLE 2

|  |  | V1 State (Small - 2 mm orifice) | |
| --- | --- | --- | --- |
|  |  | On (Open) | Off (Close) |
| V2 State (Large - 3 mm orifice) | On (Open) | High Steam | Medium Steam |
|  | Off (Close) | Low Steam | No Steam |

Figure 9C:
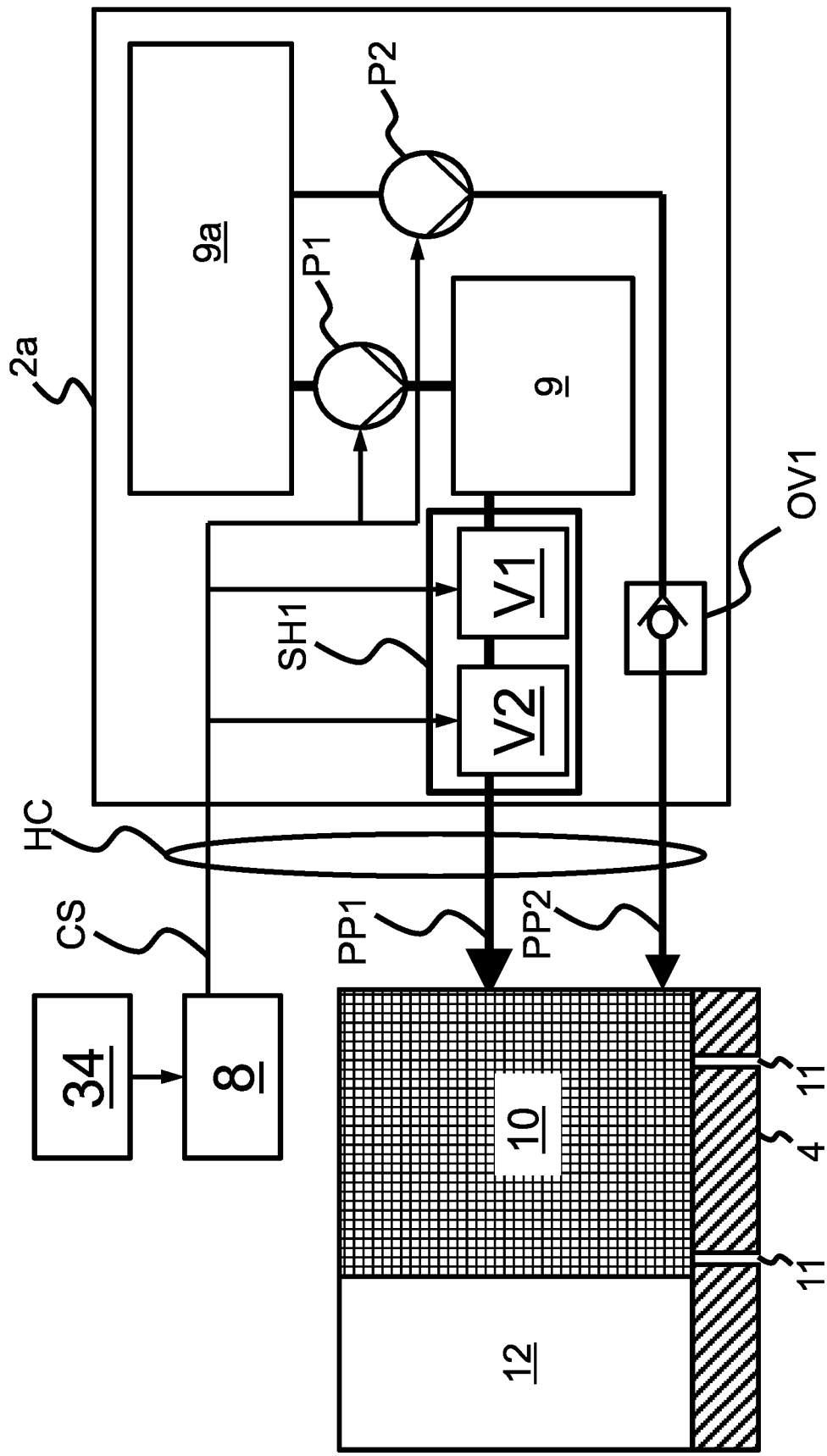

The third embodiment of this invention is as shown in FIG. 9C. In this embodiment, valves V1 and V2 are the same as V1 and V2 in second embodiment except that they are built into a single housing SH1 as one component. The high steam rate and low steam rate are delivered in the same manner as in the second embodiment.

The third embodiment of this invention reduces the amount of external tube connections, reducing the size of the E-valve configuration required to deliver this function.

Another benefit of the third embodiment is the reduction in condensation of steam to water in the E-valve configuration during the start of ironing or if the steam function has not been triggered for an extended period of time, thus reducing carryover water, which can result in a so-called "spitting" problem at the steam vents 11 of the heatable soleplate 4. This is due to the reduction of the overall thermal mass of the E-valve configuration.

Figure 9D:
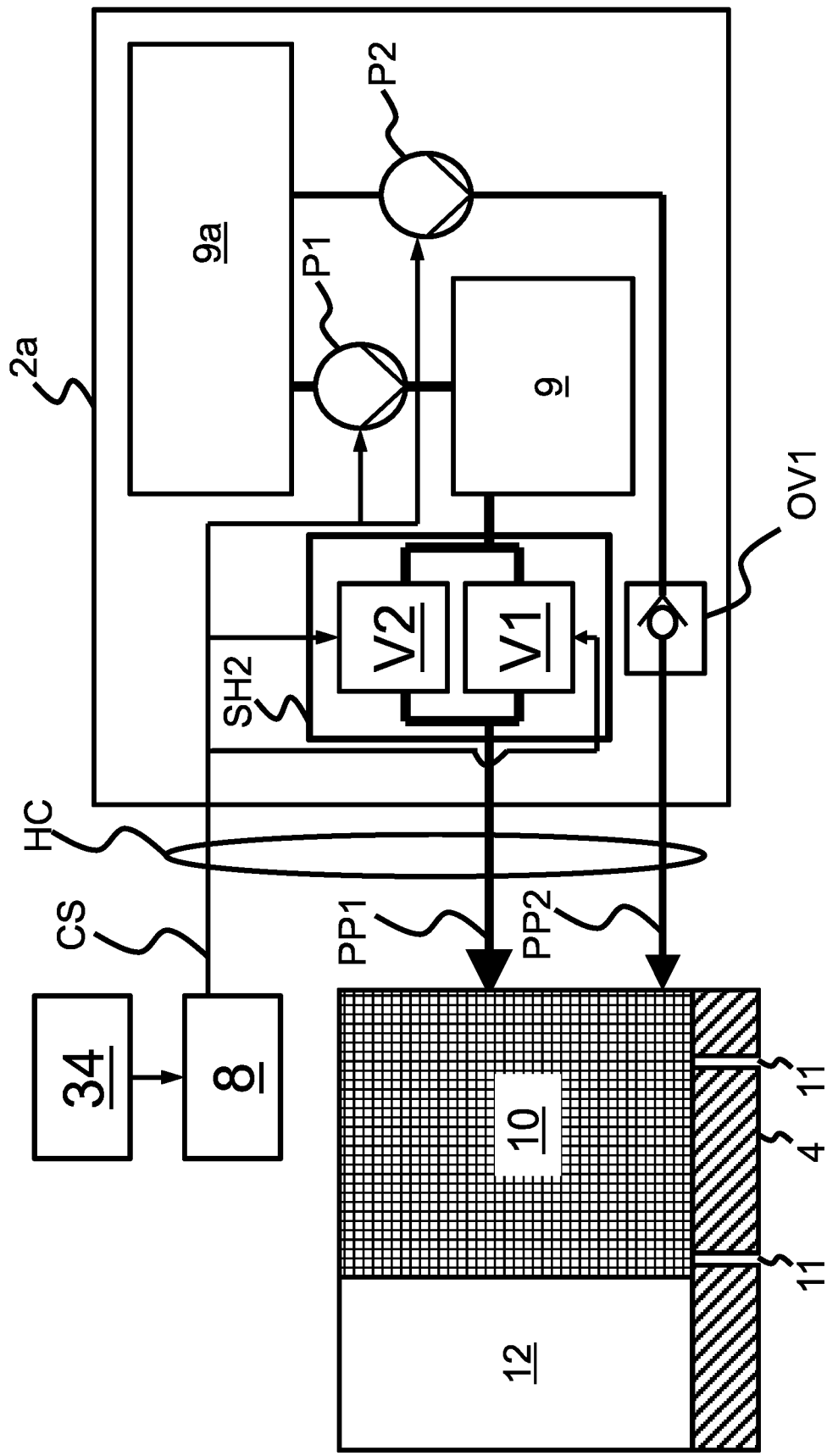

The fourth embodiment of this invention is as shown in FIG. 9D. In this embodiment, valves V1 and V2 are the same as valves V1 and V2 in the first embodiment except that they are built into a single housing SH2 as one component. The high steam rate and low steam rate are delivered in the same manner as in the first embodiment.

The benefits of size reduction of E-valve configuration and reduction in carrying over water and thus spitting described in the third embodiment are also valid in the fourth embodiment.

Figure 1A:
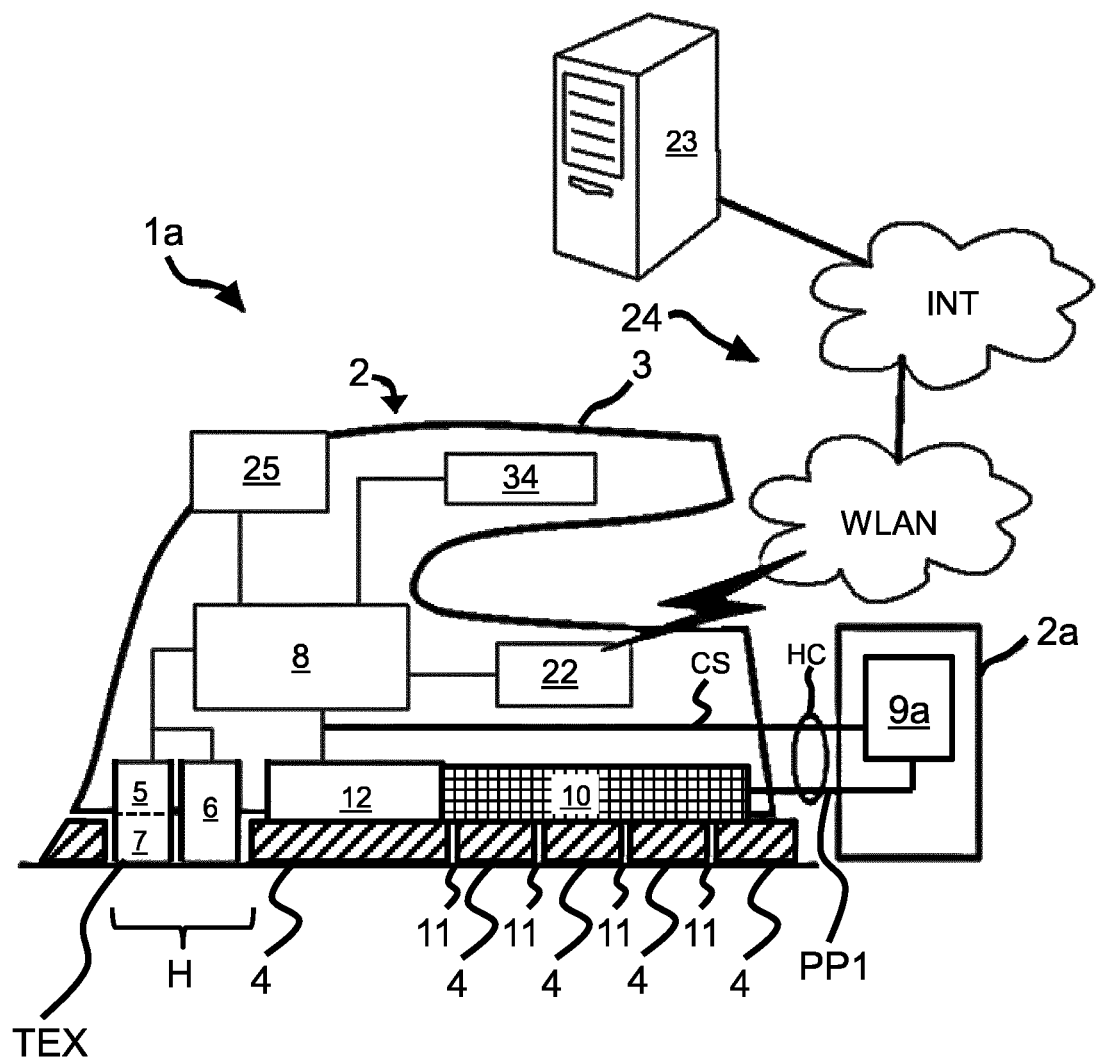
FIG. 1A schematically illustrates a textile treatment device according to a second exemplary embodiment of the invention.
Figure 1B:
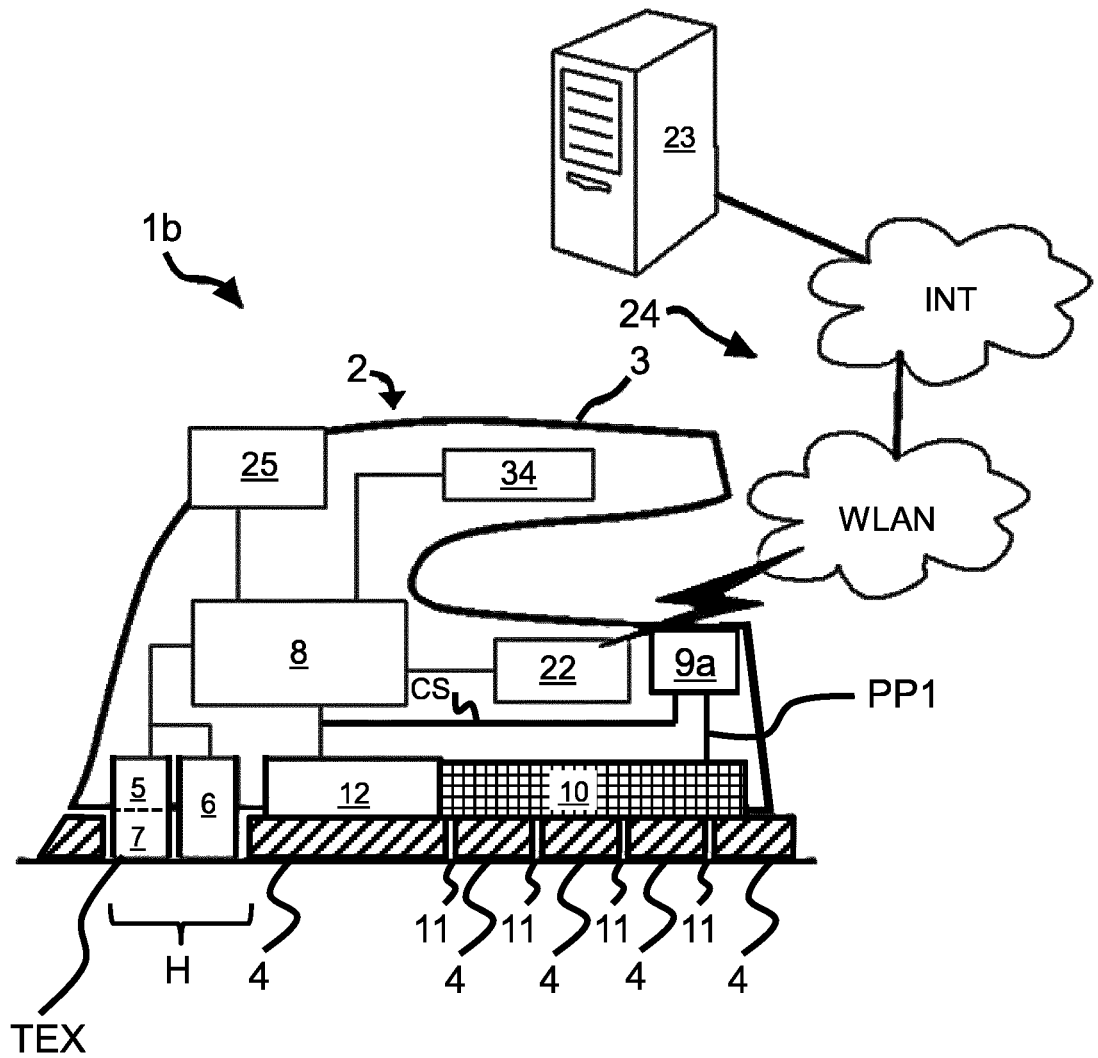
FIG. 1B schematically illustrates a textile treatment device according to a third exemplary embodiment of the invention.
Figure 1D:
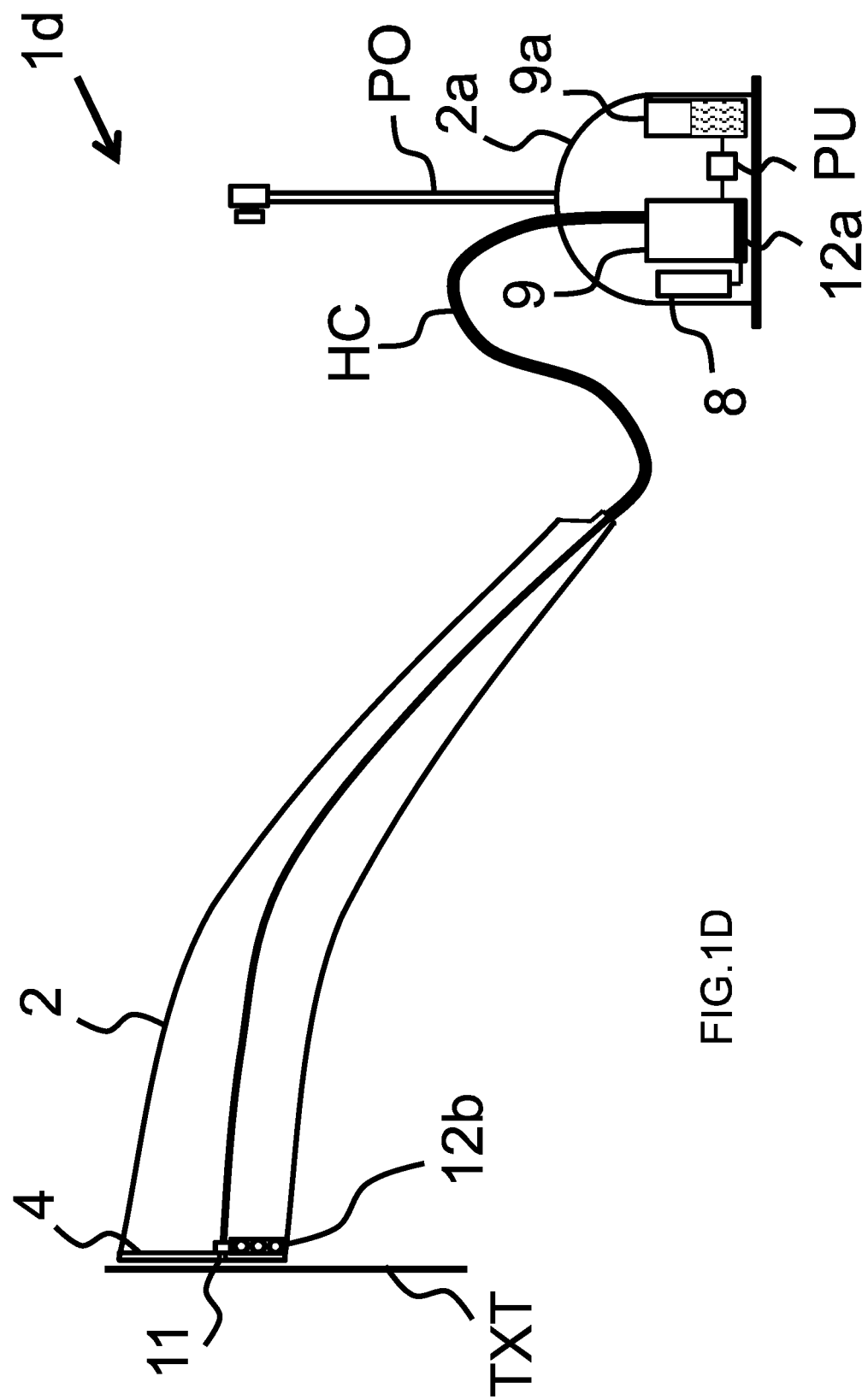
FIG. 1D schematically illustrates a textile treatment device according to a fifth exemplary embodiment of the invention.
Figure 1E:
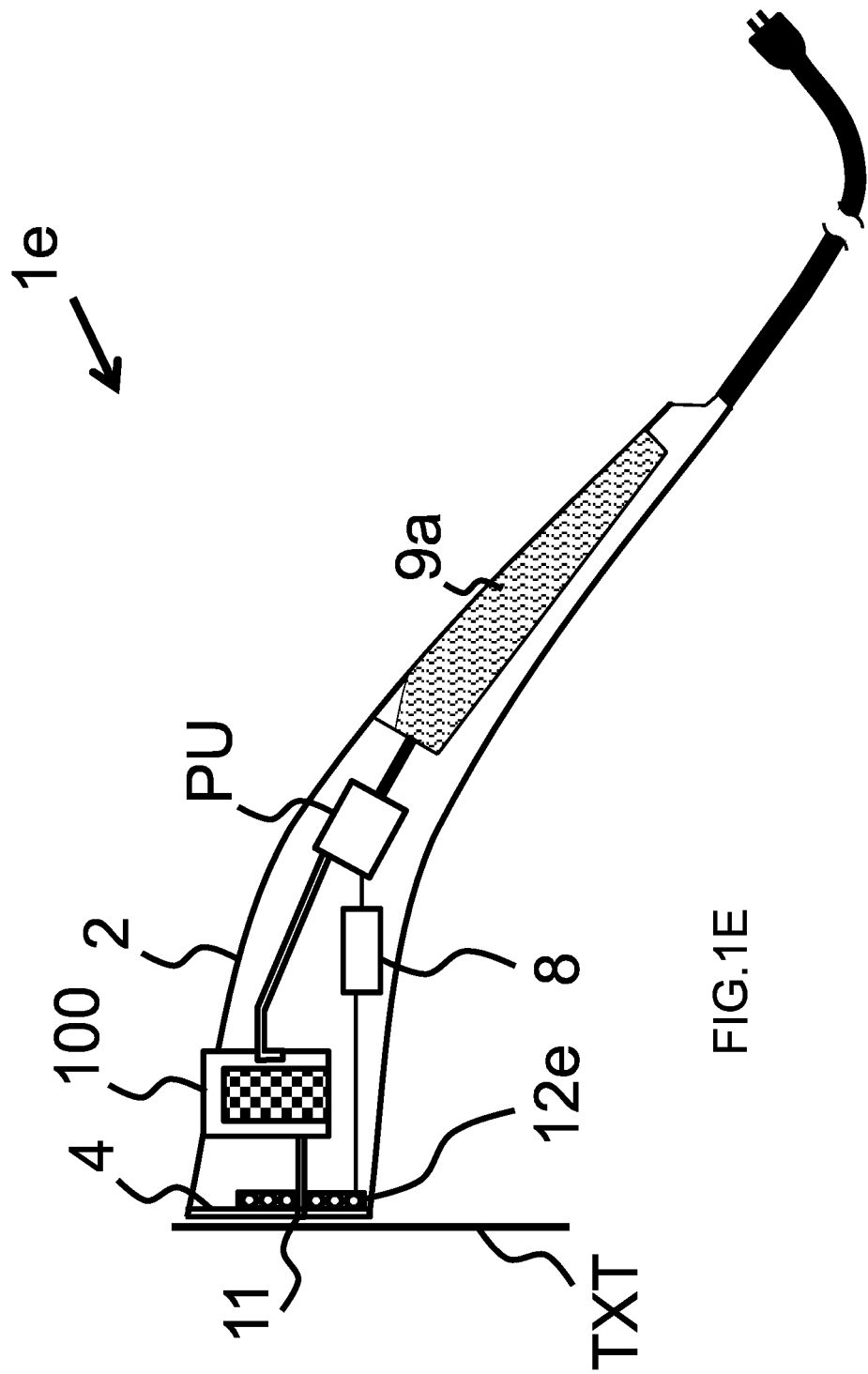
FIG. 1E schematically illustrates a textile treatment device according to a sixth exemplary embodiment of the invention.
Figure 1F:
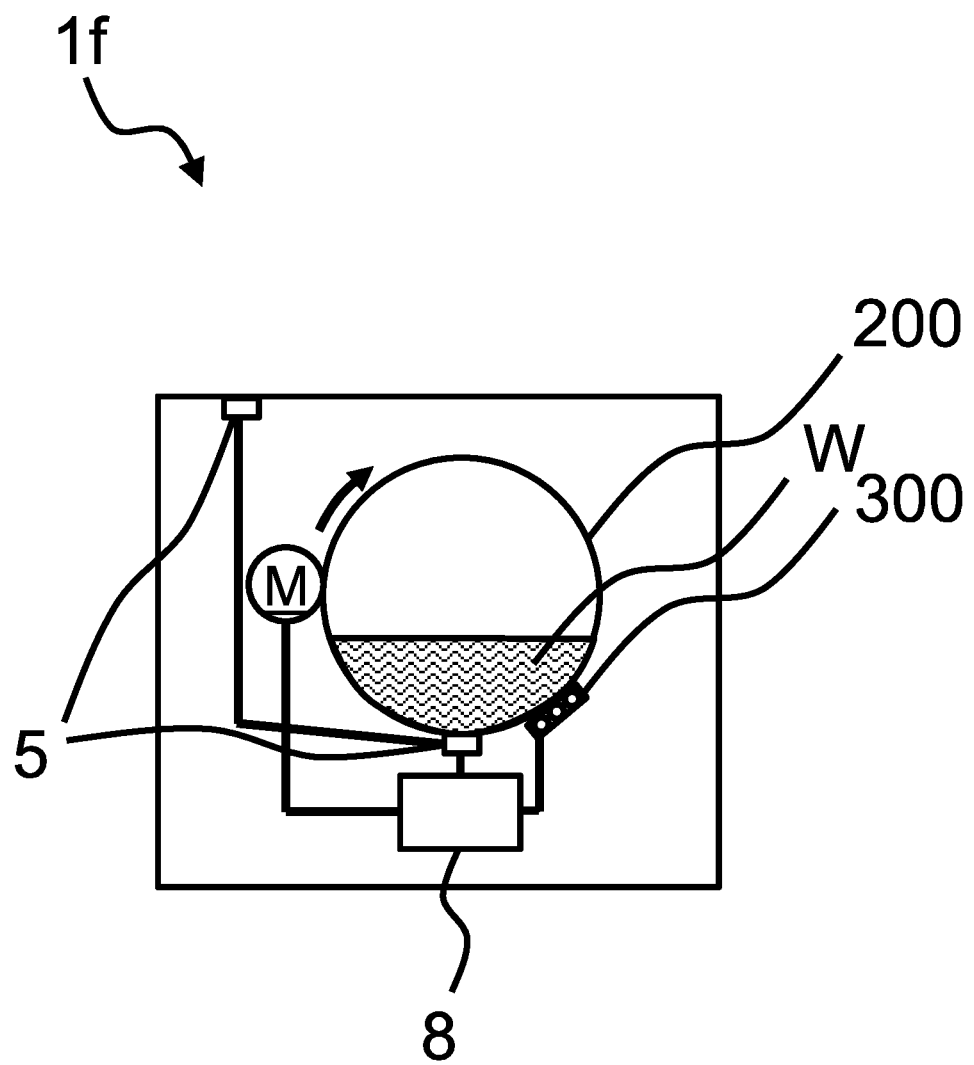
FIG. 1F schematically illustrates a textile treatment device according to a seventh exemplary embodiment of the invention.
Figure 1G:
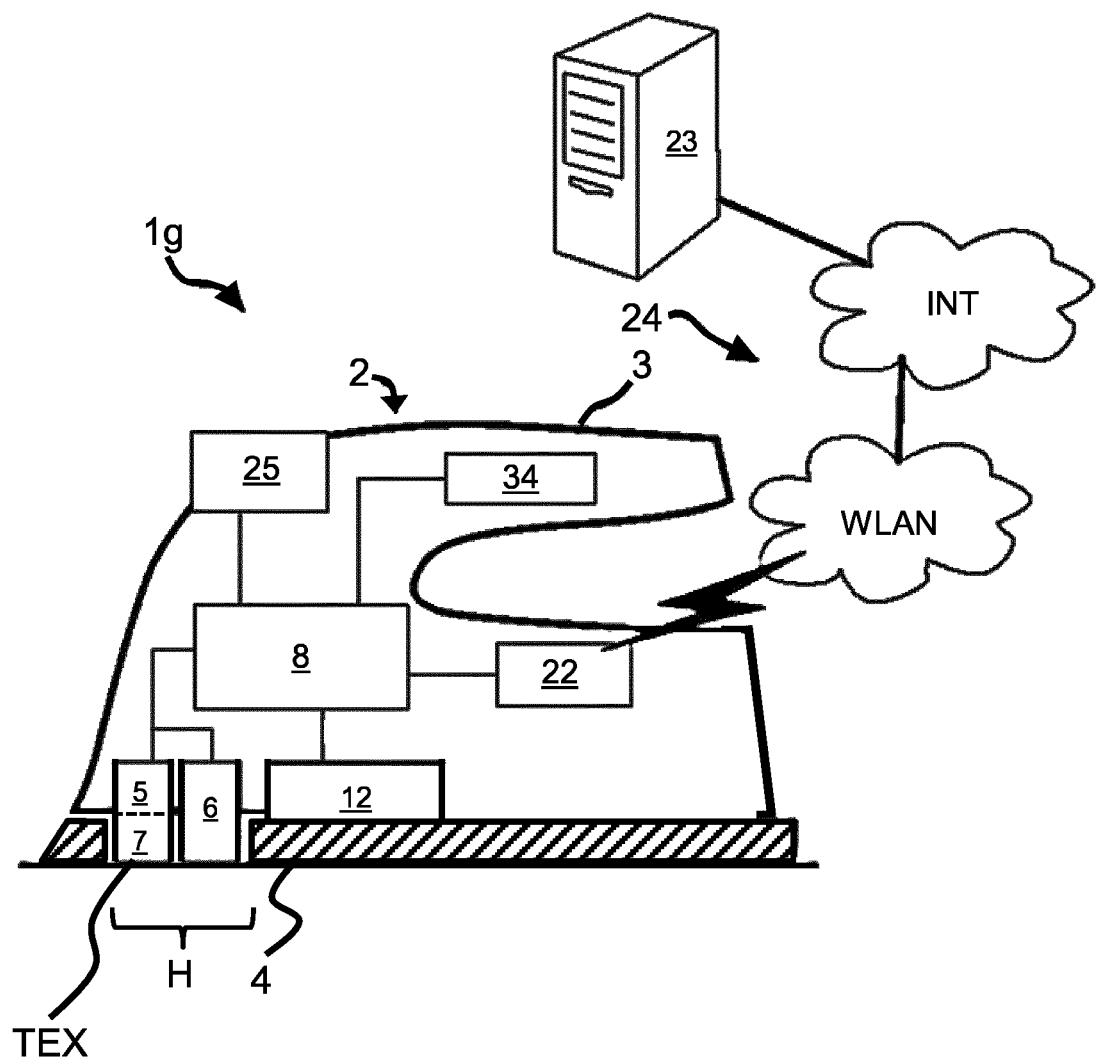
FIG. 1G schematically illustrates a textile treatment device according to an eight exemplary embodiment of the invention.
Figure 1H:
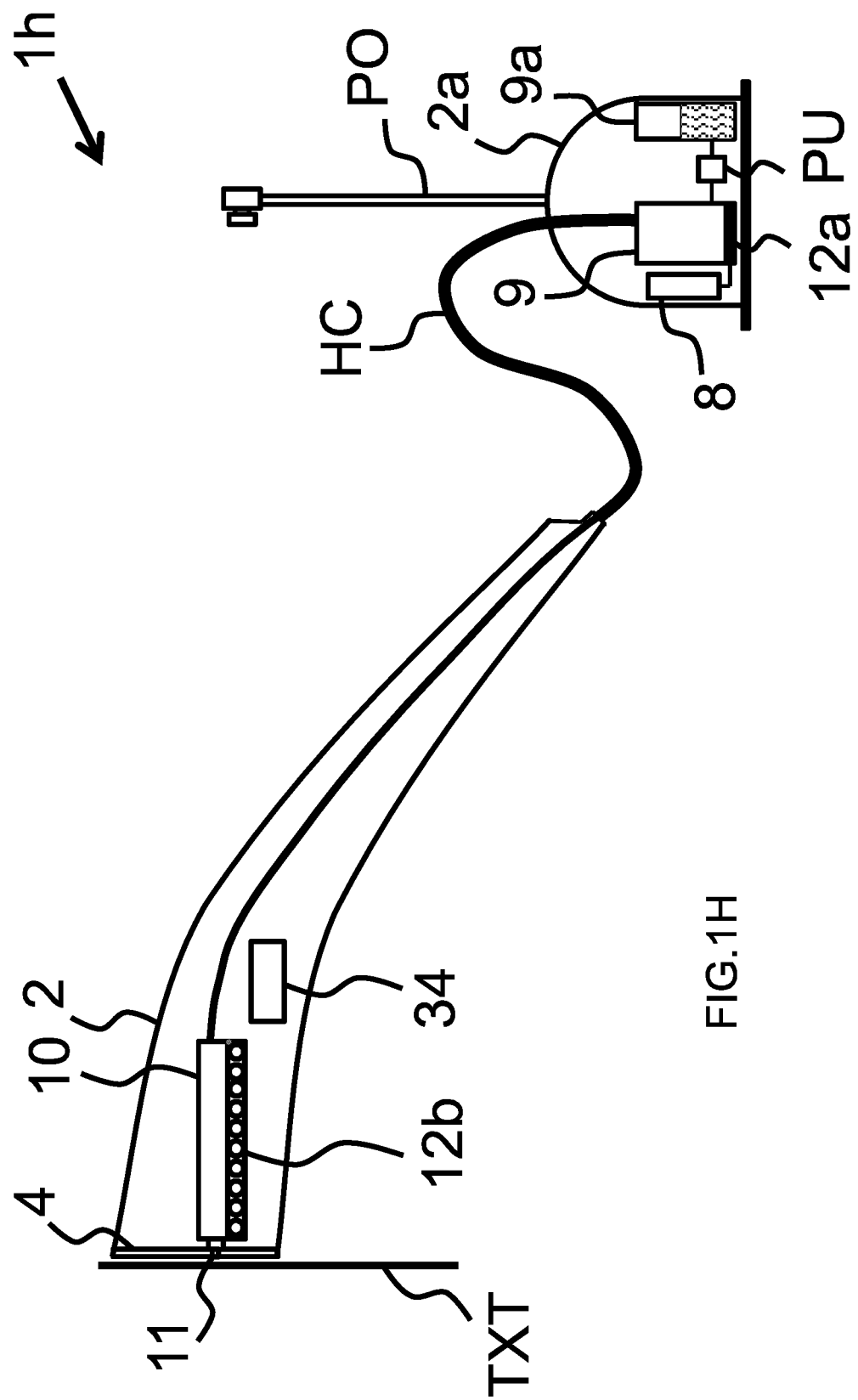
FIG. 1H schematically illustrates a textile treatment device according to a ninth exemplary embodiment of the invention.

It is noted that similar valve arrangement of valves V1 and V2 can be arranged at the exit of the steam generator of the device of FIG. 1H.

FIG. 1A schematically illustrates a textile treatment device 1a according to a second exemplary embodiment of the invention.

The textile treatment device 1a corresponds to a pressurized steam generator without boiler in the base 2a.

This embodiment differs from the embodiment described along with FIG. 1 in that the second casing 2a only comprises a water supply 9a. Water is thus supplied from the water supply 9a via the hose cord HC to the steam chamber 10 for conversion into steam.

In the embodiment of FIG. 1A, the control unit 8 is configured to control, based on the obtained classification of the textile, at least one operating parameter of the textile treatment device 1. The at least one operating parameter may include, but are not limited to:
  a temperature of the heatable soleplate 4 in the textile treatment device being intended to be in contact with the textile, and/or
  an amount of steam applied to the textile. The amount of steam can for example be varied by changing the pumping rate of an electrical water pump (not shown) arranged between the water supply 9a and the steam chamber 10, under the control of the control unit 8.

FIG. 1B schematically illustrates a textile treatment device 1b according to a third exemplary embodiment of the invention.

The textile treatment device 1b corresponds to a steam ironing device.

This embodiment differs from the embodiment described along with FIG. 1 in that there are no second casing 2a arranged. Instead, the water supply 9a is arranged inside the casing 2. Water is thus supplied from the water supply 9a to the steam chamber 10 for conversion into steam.

In the embodiment of FIG. 1B, the control unit 8 is configured to control, based on the obtained classification of the textile, at least one operating parameter of the textile treatment device 1b. The at least one operating parameter may include, but are not limited to:
  a temperature of the heatable soleplate 4 in the textile treatment device being intended to be in contact with the textile, and/or
  an amount of steam applied to the textile. The amount of steam can for example be varied by opening/closing a water valve (not shown) arranged between the water supply 9a and the steam chamber 10, under the control of the control unit 8. The amount of steam can also be varied by changing the pumping rate of an electrical water pump (not shown) arranged between the water supply 9a and the steam chamber 10, under the control of the control unit 8.

FIG. 1C schematically illustrates a textile treatment device 1c according to a fourth exemplary embodiment of the invention.

The textile treatment device 1c corresponds to a handheld garment steamer.

The textile treatment device 1c comprises a casing 2 in which are arranged a water supply 9c for supplying water to a steam chamber 10, for example via an electrical water pump PU. The steam chamber 10 is heated by heating element 12c. Steam generated by the steam chamber 10 is applied on the textile (i.e. garment) TXT via steam vent(s) 11 arranged in a heatable soleplate 4. The heatable soleplate 4 is heated by heating element 12c. A control unit 8 allows controlling the pumping rate of pump PU and the electrical power supplied to the heating element 12c. For sake of representation, the communication system 22, the image sensor, and the interface 25 are not represented. The image sensor can be arranged in the heatable soleplate 4 similarly as the embodiment of FIG. 1.

In the embodiment of FIG. 1C, the control unit 8 is configured to control, based on the obtained classification of the textile, at least one operating parameter of the textile treatment device 1c. The at least one operating parameter may include, but are not limited to:
  a temperature of the heatable soleplate 4 in the textile treatment device being intended to be in contact with the textile, and/or
  an amount of steam applied to the textile. The amount of steam can for example be varied by changing the pumping rate of the electric water pump PU arranged between the water supply 9a and the steam chamber 10, under the control of the control unit 8.

FIG. 1D schematically illustrates a textile treatment device 1d according to a fifth exemplary embodiment of the invention.

The textile treatment device 1d corresponds to a stand garment steamer.

The textile treatment device 1d comprises a casing 2a in which are arranged a water supply 9c for supplying water to a steam chamber 10, for example via an electrical water pump PU. The steam chamber 10 is heated by heating element 12a. Steam generated by the steam chamber 10 is carried via a hose cord HC to a handheld casing 2. The handheld casing 2 is represented bigger than in reality, for sake of clarity. The casing 2a may comprise a pole PO to rest the handheld casing 2. Steam is applied on the textile (i.e. garment) TXT via steam vent(s) 11 arranged in a heatable soleplate 4. The heatable soleplate 4 is heated by heating element 12b. A control unit 8 allows controlling the pumping rate of pump PU, the electrical power supplied to the heating element 12a and 12b. For sake of representation, the communication system 22, the image sensor, and the interface 25 are not represented. The image sensor can be arranged in the heatable soleplate 4 similarly as the embodiment of FIG. 1.

In the embodiment of FIG. 1D, the control unit 8 is configured to control, based on the obtained classification of the textile, at least one operating parameter of the textile treatment device 1d. The at least one operating parameter may include, but are not limited to:
  a temperature of the heatable soleplate 4 in the textile treatment device being intended to be in contact with the textile, and/or
  an amount of steam applied to the textile. The amount of steam can for example be varied by changing the pumping rate of the electric water pump PU arranged between the water supply 9a and the steam chamber 10, under the control of the control unit 8.

FIG. 1H schematically illustrates a textile treatment device 1h according to a ninth exemplary embodiment of the invention.

The textile treatment device 1h corresponds to a stand garment steamer. Is has the same elements as the textile treatment device 1d described above.

In addition, the textile treatment device 1h also comprises a steam chamber 10 adapted to receive steam from the hose cord HC.

The steam chamber 10 is in thermal contact with a heating system 12b. Steam received from the hose cord HC enters the steam chamber 10, and is re-heated inside the steam chamber 10, and water droplets that would be in this flow of steam are evaporated. The re-heated steam then exits the steam chamber 10 at the steam vents 11.

The textile treatment device 1h has the advantage that steam exiting the steam vents 11 does not contain water droplets.

FIG. 1E schematically illustrates a textile treatment device 1e according to a sixth exemplary embodiment of the invention.

The textile treatment device 1e corresponds to a stain removal device.

The textile treatment device 1e comprises a casing 2 in which are arranged a water supply 9c for supplying water to a container 100 containing a stain removal material in solid or liquid form, for example via an electrical water pump PU. Stain removal material solution which exits the container 100 is applied on the textile (i.e. garment) TXT via a vent(s) 11 arranged in a heatable soleplate 4, for removing a stained area on the textile. The heatable soleplate 4 is heated by heating element 12e. The heat generated by the heatable soleplate 4 allows accelerating the stain removal process, the efficiency of the stain removal, and drying the treated stained area. A control unit 8 allows controlling the pumping rate of pump PU and the electrical power supplied to the heating element 12e. For sake of representation, the communication system 22 and the image sensor 5 are not represented. The image sensor can be arranged in the heatable soleplate 4 similarly as the embodiment of FIG. 1.

In the embodiment of FIG. 1E, the control unit 8 is configured to control, based on the obtained classification of the textile, at least one operating parameter of the textile treatment device 1e. The at least one operating parameter may include, but are not limited to:
  a temperature of the heatable soleplate 4 in the textile treatment device being intended to be in contact with the textile.

FIG. 1F schematically illustrates a textile treatment device 1f according to a seventh exemplary embodiment of the invention.

The textile treatment device 1f corresponds to a washing machine device.

The textile treatment device 1f comprises a tumbler 200 for receiving textile (i.e. garments) to wash. The tumbler 200 is brought into rotation by motor M. The tumbler 200 is adapted to receive water W from a water supply (not shown). A heating element 300 is arranged in contact with the tumbler 200 to heat the water W in the tumbler. A control unit 8 allows controlling the rotation speed of the motor M, and the electrical power supplied to the heating element 300. For sake of representation, the communication system 22, the image sensor, and the interface 25 are not represented. The image sensor 5 can be arranged in a bottom inside part of the tumbler 200, or arranged in a top part of the textile treatment device 1f.

In the embodiment of FIG. 1F, the control unit 8 is configured to control, based on the obtained classification of the textile, at least one operating parameter of the textile treatment device 1f. The at least one operating parameter may include, but are not limited to:
  a temperature of the water used to washing the textile (i.e. garments): for example lower temperature for textiles classified as delicate, and higher temperature for textiles classified as tough, and/or
  a duration of the washing cycle: for example shorter duration for textiles classified as delicate, and longer duration for textiles classified as tough, and/or
  a rotational speed of the tumbler during spin dry cycle: The rotational speed of the tumbler can for example be varied by varying the rotation speed of motor M bringing the tumbler in rotation. For example low rotation speed for textiles classified as delicate, and high rotation speed for textiles classified as tough.

FIG. 1G schematically illustrates a textile treatment device 1g according to an eight exemplary embodiment of the invention.

The textile treatment device 1g corresponds to a dry ironing device.

This embodiment differs from the embodiment described along with FIG. 1B in that it does not implement the water supply 9c, nor the steam chamber 10. The heatable soleplate 4 also does not comprise vents anymore.

In the embodiment of FIG. 1G, the control unit 8 is configured to control, based on the obtained classification of the textile, at least one operating parameter of the textile treatment device 1e. The at least one operating parameter may include, but are not limited to:
  a temperature of the heatable soleplate 4 in the textile treatment device being intended to be in contact with the textile.

In the embodiments described above comprising a steam engine for generating steam to be supplied to the textile, such as the steam generator 9 and/or the steam chamber 10, the amount of steam can be set based on the obtained classification of the textile.

Preferably, a textile which is classified to the class "delicate" is treated using a lower amount of steam, for example in the range 50-99 g/mn.

Preferably, a textile which is assigned to the class "tough" is treated using a higher amount of steam, for example in the range 100-160 g/mn.

Increasing the steam rate if the fabric is deemed as more tough (or less delicate), improves the ironing and/or steaming results in terms of removing creases on the textile/garments.

It has been shown that using the classification of the textile, it is possible to efficiently adapt operation of the textile treatment device 1 to the textile under treatment. Thereby, this contributes to a convenient and optimal result of the textile treatment, and also prevents damaging the textile due to improper settings of the textile treatment device 1. It is possible for the textile treatment device 1 to automatically adjust at least one operating parameter of the textile treatment device 1 during treatment of a textile if the textile treatment device 1 detects a change in the textile classification. Thereby, a time-efficient treatment of the textile (or garment made of a textile) is made possible.

In the exemplary textile treatment device 1, which is shown in FIG. 1, the algorithm which is executed by the control unit 8 includes an artificial neural network (ANN).

The term artificial neural network may be defined to mean a collection of neural processing units. The ANN has connections between the neural processing units which have a connection weight. The ANN may include a plurality of layers. The layers may include an input layer, one or more hidden layers (also denoted as intermediate layers), and an output layer. The ANN may be a feedforward neural network or a recurrent neural network.

Figure 2A:
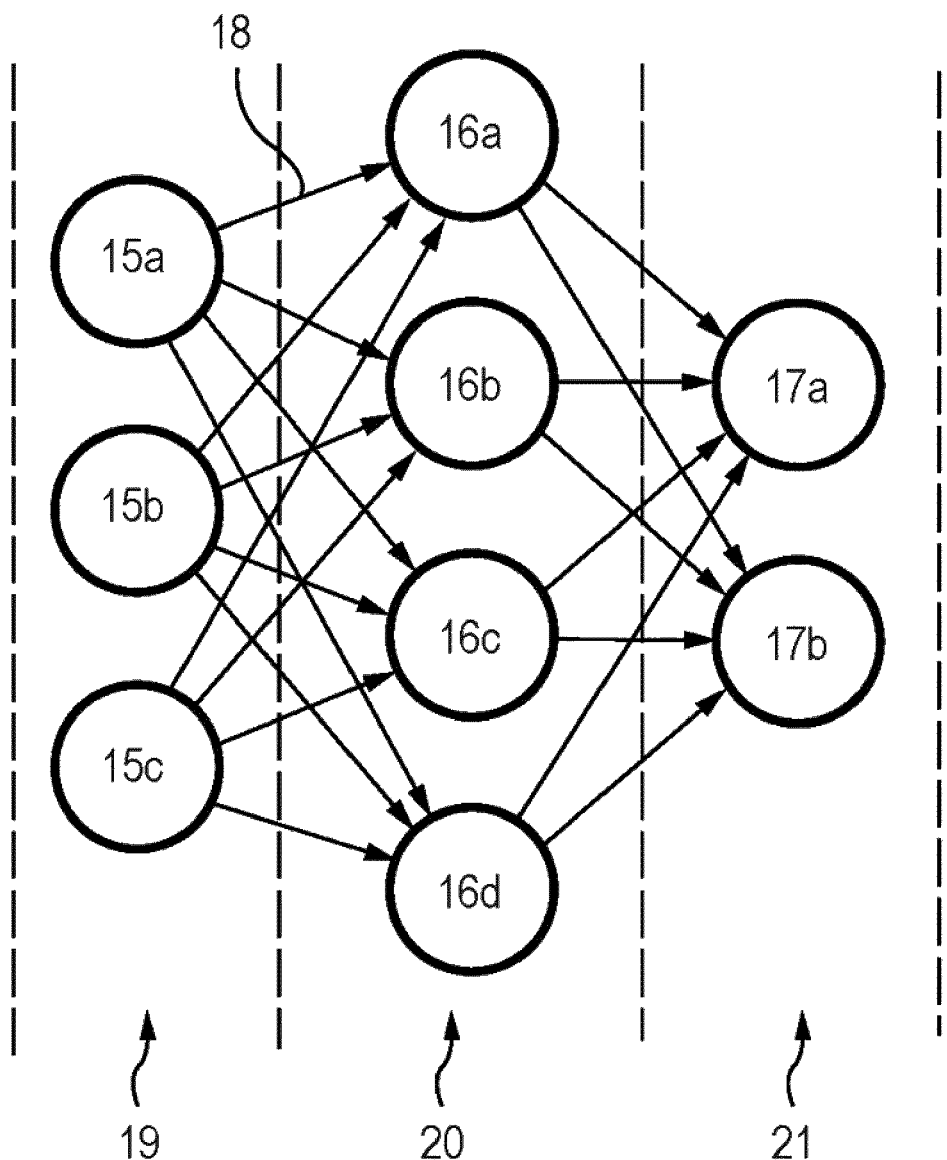
FIG. 2A schematically illustrates an artificial neural network (ANN) which is executed by a control unit of the textile treatment device of FIG. 1.

FIG. 2A is a schematic illustration of an ANN 14. The ANN 14 includes a plurality of neural processing units 15a, 15b, 17b. The neural processing units 15a, 15b, 17b are connected to form a network via a plurality of connections, each having a connection weight 18. Each of the connections connects a neural processing unit of a first layer of the ANN 14 to a neural processing unit of a second layer of the ANN 14, which immediately succeeds the first layer. Thereby, the ANN 14 has a layer structure which includes an input layer 19, at least one intermediate layer 20 (also denoted as hidden layer) and an output layer 21.

It has been shown that using the ANN 14, it is possible to efficiently and reliably classify textiles which are under treatment, so that operating parameters can be adapted for ensuring proper treatment of the textile, and which eliminate the risk of damaging the textile.

In the exemplary embodiment, the ANN 14 is preferably trained by an external computing system, using images from a database and associated their known textile classifications. The trained ANN is then stored in the textile treatment device 1.

The higher the number of images used for the training of the ANN, the better the performance of the ANN for classifying a given textile from which an image is taken by the image sensor arranged in the textile treatment device 1.

Figure 2B:
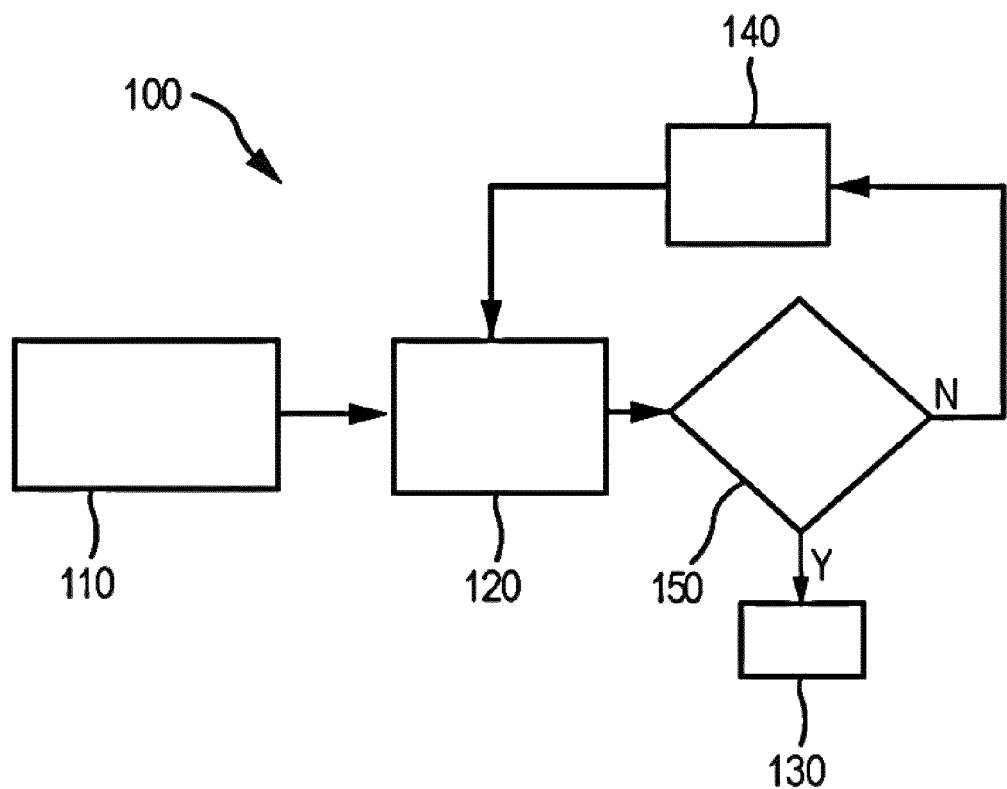
FIG. 2B schematically illustrates an exemplary process for training the ANN illustrated in FIG. 2A.

An exemplary training process 100 for training the ANN is schematically illustrated in FIG. 2B.

The training process 100 leads to a weight correction of the connection weights 18 (shown in FIG. 2A) of the ANN 14. The training process 100 is iterative.

In a first iteration, the connection weights of the ANN are initialized to small random values. An input of sample images of known textiles is provided in step 110 as an input to the ANN.

The ANN classifies the input in step 120. Based on a comparison between the classification of the input and the known textiles, it is determined in decision step 150, whether the classification is performed with a sufficient accuracy.

If the classification is performed with a sufficient accuracy (decision step 150: Y), the training process 100 is ended in step 130.

If the classification is not performed with a sufficient accuracy (decision step 150: N), the connection weights of the ANN are adjusted in step 140. After the adjustment of the connection weights, a further classification 120 of the same or of different known input samples is performed.

In the illustrated exemplary embodiment, the operations of the training process is preferably performed in an external computing system 23 (shown in FIG. 1), which is external to the textile treatment device 1. The external computing system 23 may include, but is not limited to:
- at least one remote computer: for example a computer to which a user does not have physical access. By way of example, the user accesses the remote computer via a network.
- at least one network computer,
- at least one cloud computer,
- a mobile phone,
- a smart phone, or
- a desktop computer.

Using the external computing system 23, it is possible to perform a faster and more accurate training of the ANN, compared to conducting this same training on the textile treatment device 1. However, it is also possible that the training process is performed by the textile treatment device 1, if the control unit 8 has sufficient computational resources.

As is illustrated in FIG. 1, the textile treatment device 1 includes a communication system 22, for connecting the textile treatment device 1 to the external computing system 23, for example via a network 24.

Further, the network 24 may include the Internet (INT) and an Intranet which is a wired or wireless local area network (WLAN).

It is also possible that the textile treatment device 1 is connectable to the external computing system 23 via any other transmission medium defining a wireless and/or wire-based transmission.

The textile treatment device 1 is adapted to transmit to the external computing system 23, using the communication system 22, images taken by the image sensor, as well as an associated textile classification.

In case the user is of the opinion that the algorithm did not correctly identify the classification of the textile, the user can manually enter a user input (via an interface that will be described later) corresponding to a corrected textile classification. The user input corresponds to a different classification of the textile which deviates from the classification of the textile obtained by the control unit 8. The corrected textile classification (also called user-specified classification) can not only be used by the device 1 to control an operating parameter of the device accordingly, but also be sent by the communication system 22 and used by the external computing system 23 as input for a new training of the algorithm, as similarly described along with FIG. 2B.

The textile treatment device 1 includes a user interface 25 (shown in FIG. 1) for receiving a user input from a user who is treating the textile. As previously described, the user input corresponds to a corrected textile classification.

For Example, the user Interface 25 Allows the user:
- entering letters and/or numbers for writing the name of the corrected textile classification user is considering, and/or
- pressing at least one button (or key) associated to the corrected textile classification user is considering, and/or
- selecting the corrected textile classification user is considering, among a list of proposed textile classifications displayed on a screen.

The user-specified classification may include an assignment of the textile to at least one pre-defined classes as described previously.

The user-specified classification may correspond to a classification of the textile determined based on the user's knowledge only, or user's own appreciation, or based on a guidance from various indications such as content of the care label (also denoted as laundry tag) of the textile, such as "wool", "nylon", "linen" or "cotton".

Preferably, any of the textile treatment devices according to the invention is adapted to store a plurality of user-specified classifications (i.e. corresponding to different classifications compared to the initial textile classifications obtained by the textile treatment device), and each of the associated taken images, before transmission to the external computing system 23.

Sending a plurality of manually corrected textile classification can advantageously be used by the external computing system as input for a new training of the algorithm.

Preferably, the textile treatment device is adapted to receive, from the external computing system (23), using the communication system 22, an updated version of the algorithm.

If the updated version of the algorithm is an improved version of the algorithm initially stored, for example an improved version obtained after a new training, the textile classification is more accurate and robust.

In the exemplary embodiment, which is illustrated in FIG. 1, the ANN is configured as a convolutional neural network (CNN).

Figure 3:
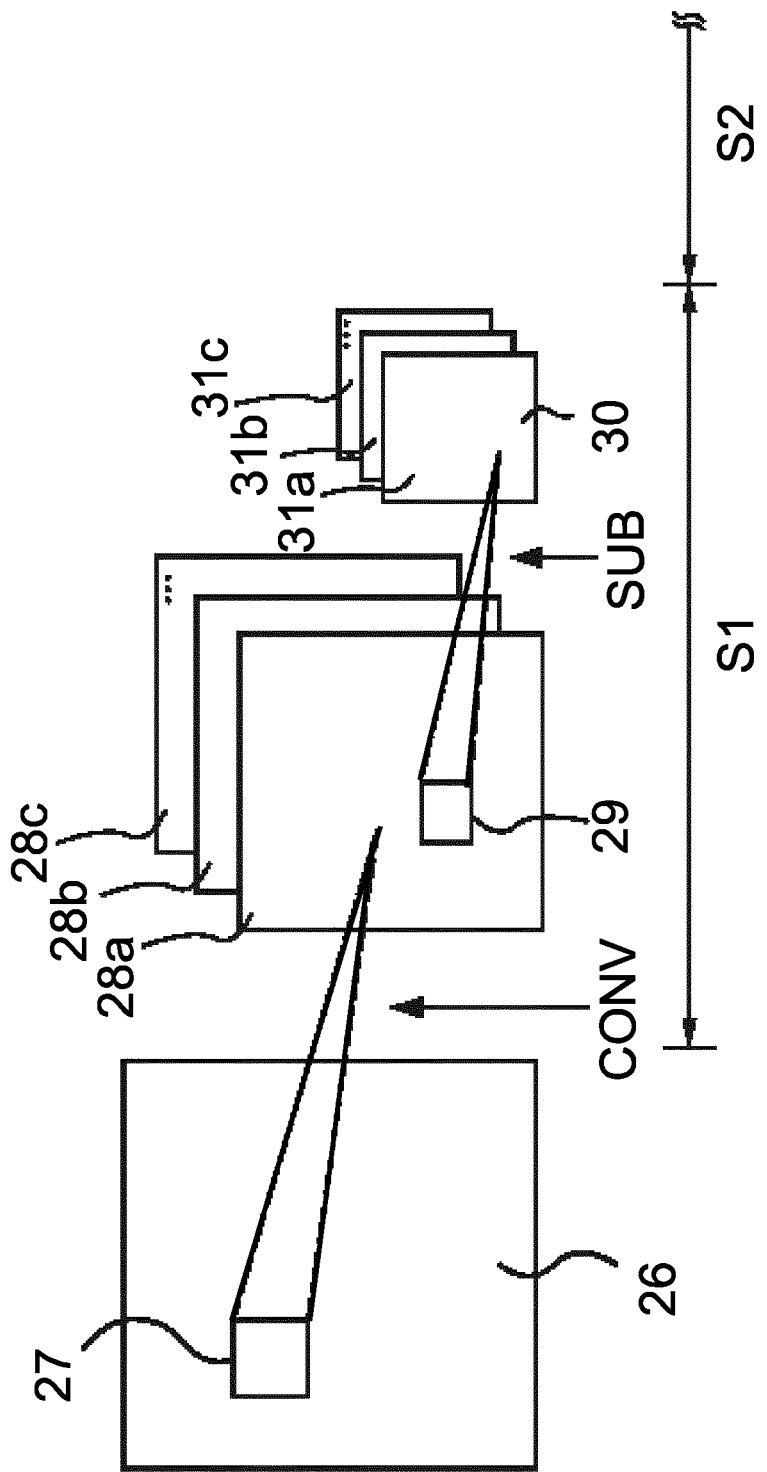
FIG. 3 schematically illustrates a portion of a convolutional neural network (CNN) which is executed by a control unit in a textile treatment device according to the invention.

FIG. 3 shows an exemplary configuration of the CNN. A convolutional layer is configured to perform a convolution CONV of an input image 26 provided to the convolutional layer.

Using a CNN as a classifier is relatively computationally less demanding. In particular, substantially instant classifications can be generated by a CNN running on low-computational resources hardware. This also contributes to make possible the integration of the image sensor and the control unit within the portable textile treatment device, for textile classification.

As mentioned above, an advantage of executing a CNN is that the computational resources are relatively low compared to more traditional image processing algorithms, which makes its execution in the textile treatment device easier, without the need to have a control unit having very high computational resources. The term "convolutional neural network" may be defined to mean an ANN having at least one convolutional layer. A convolutional layer may be defined as a layer which applies a convolution to a layer which immediately precedes the convolutional layer. The convolutional layer may include a plurality of neural processing units, wherein each of the neural processing units receives inputs from a pre-defined section of the preceding layer. The pre-defined section may also be called a local receptive field of the neural processing unit. The distribution of weights within the pre-defined section may be the same for each neural processing unit in the convolutional layer. In addition to the convolutional layers, the CNN may include one or more subsampling layers and/or one or more normalization layers.

In the textile treatment device according to the invention, a field of view of the image sensor is in the range 1×1 mm to 5×5 mm. This field of view corresponds to the minimal dimension, taken on the textile, and that needs to be imaged to capture sufficient details of the textile structure.

More generally, a field of view of the taken image is in the range of 1 mm$^2$ to 25 mm$^2$ of a rectangular or squared area with at least 1 mm in one dimension. However, a larger field of view could also be considered.

Choosing the field of view in this range allows taking an image containing sufficient details of the textile, in particular the weaving pattern and/or size of yarn and interlacing fibers.

Taking a picture with a field of view smaller than the lower value of this range would not allow capturing sufficient details of the textile.

On the contrary, taking a picture with a field of view larger than the upper value of this range would only allow capturing redundant information on the details of the textile, given the periodic structure of the weaving pattern of the textile. This would result in increasing the computational resources for no significant added benefits in terms of textile classification.

Alternatively, images having field of view in this range can be obtained from an image having a larger field of view, followed by an appropriate down-sampling or downsizing.

Preferably, a resolution of the input image 26 given as input of the algorithm defines a square array of pixels in the range 64×64 pixels and 320×320 pixels.

Choosing the resolution in this range allows sampling a given field of view with sufficient details of the textile, while limiting the computational resources.

Preferably, a resolution proportional to the field of view can be chosen.

Images having resolution in this range can directly be obtained from the image sensor having the same resolution.

Alternatively, images having resolution in this range can be obtained from an image sensor having a better resolution, followed by an appropriate down-sampling or downsizing.

A convolutional layer applies a convolution operation to the input, passing the result to the next layer. A convolution layer includes a plurality of neural processing units. Each of the neural processing units receives inputs from an input section 27 of the input image 26, which is shifted during the convolution operation.

The input section 27 may correspond to a two-dimensional array of pixels, for example a rectangular or squared section of the input image 26, such as, for example, a cluster of 3×3 or 4×4 or 5×5 pixels.

The input section 27 may also be denoted as a local receptive field for the neural processing unit. The neural processing unit may be configured to process the a section 27 of the input image 26 using weights that form a convolution matrix or kernel matrix which is multiplied with the input section 27. In other words, the convolutional layer performs an element-wise multiplication of the values in the kernel matrix with the pixel values of the input section. The multiplications are all summed up to obtain a single number. Each neural processing unit of the convolutional layer may have the same weight values within the kernel matrix. This concept is known as weight sharing. The convolution layer may have one or more dimensions. For each dimension, the convolution layer outputs a two-dimensional array 28a, 28b and 28c of values representing an output image.

The CNN may also include one or more subsampling layers SUB. Each of the subsampling layers may be arranged between two neighboring convolutional layers. The subsampling layer may be configured to perform a non-linear down-sampling on each of the output images 28a, 28b, 28c of the preceding convolutional layer which are input images of the subsampling layer. Thereby, the subsampling layer forms, for each of the input images 28a, 28b and 28c, a down-sampled output image 31a, 31b, and 31c.

Specifically, the subsampling layer partitions each of the input image 28a, 28b, 28c into a set of non-overlapping rectangular sub-regions and, for each of these sub-regions, outputs an output value which is determined by applying a non-linear function on each of the rectangular sub-regions. Several non-linear functions are conceivable to implement a subsampling layer. One of these functions is the so-called "max pooling" or generally pooling function. Using the "max pooling" function, the subsampling layer determines the maximum pixel value contained in a rectangular or squared sub-region.

In the exemplary CNN, which is illustrated in FIG. 3, the first two layers are a convolutional layer and a subsampling layer, which together form a first stage S1 of the CNN. This 1st stage is followed by one or more combinations of a convolutional layer and a subsampling layer.

This first stage S1 is followed by a second stage S2 during which final textile classification is performed.

Figure 3A:
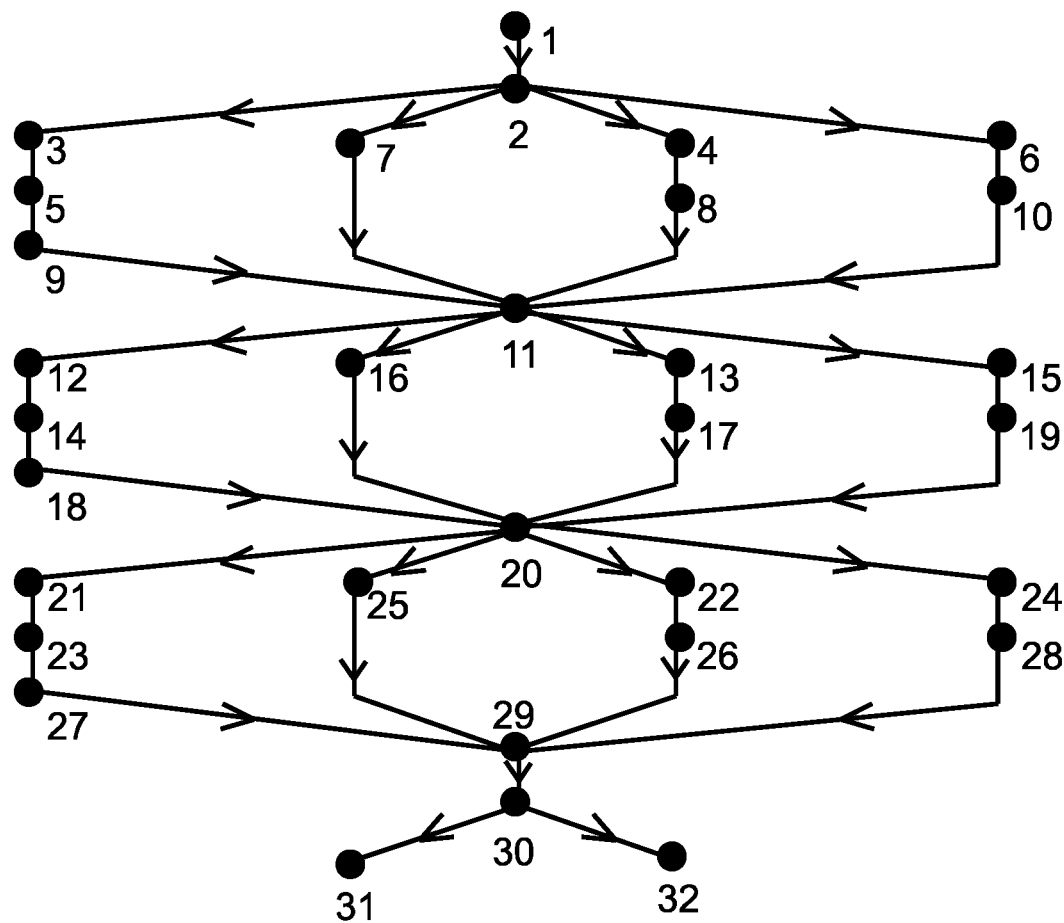
FIG. 3A schematically illustrates an example of a convolutional neural network (CNN) which is executed by a control unit of the textile treatment device according to the invention.

FIG. 3A schematically illustrates an example of a convolutional neural network (CNN) which is executed by a control unit of the textile treatment device according to the invention.

Every dot is a layer of the neural network. In total the network has 32 layers. The layer number is indicated by the first part of the name of every layer.

Layer 1 is simply the input image taken by the image sensor. The input image has a resolution of 96×96 pixels, and there is only 1 input image. This is indicated by "_96×96×1" in the name of layer 1.

Layer 2 is a convolutional layer that applies 20 different convolutions to its input. Its input is the output of layer 1 (so the 96×96×1 image). Its output are 20 images with a resolution of 48×48 pixels each. This is indicated by the "_48×48×20" in the name of layer 2.

The output of layer 2 (so the 20 images of 48×48 pixels) is used as the input for four different layers of the neural net, namely layer 3, layer 7, layer 4 and layer 6.

Layer 3 applies 16 different convolution to the 20 images and creates 16 images with a resolution of 48×48. The output of layer 3 is used by layer 5.

Layer 7 applies 16 different convolutions to the 20 images and creates 16 images with a resolution of 24×24.

Layer 4 applies 16 different convolutions to the 20 images and creates 16 images with a resolution of 48×48.

Layer 6 is an average pooling layer, that converts the 48×48 image into a 24×24 resolution image.

Etc.

Layer 11 combines the outputs of layer 9, layer 7, layer 8 and layer 10.

Etc.

Etc.

At the end of the neural network are layer 31 and layer 32. They correspond to neural layers that take a weighted sum of their inputs to finally come up with an estimation of delicate/tough (layer 31) and an estimation of wool/silk/cotton/jeans/linen/ . . . (layer 32).

The Different Layers can be Summarized as Follows with Self-Explanatory Labeling (the First Number Designating the Corresponding Layer Number in FIG. 3A):

1: 1_input_1_96×96×1
2: 2_convolution2d_1_48×48×20
3: 3_convolution2d_5_48×48×16
4: 4_convolution2d_3_48×48×16
5: 5_convolution2d_6_48×48×16
6: 6_ayeragepooling2d_1_24×24×16
7: 7_convolution2d_2_24×24×16
8: 8_convolution2d_4_24×24×16
9: 9_convolution2d_7_24×24×16
10: 10_conyolution2d_8_24×24×16
11: 11_merge_1_24×24×64
12: 12_conyolution2d_12_24×24×32
13: 13_conyolution2d_10_24×24×32
14: 14_conyolution2d_13_24×24×32
15: 15_averagepooling2d_2_12×12×32
16: 16_conyolution2d_9_12×12×32
17: 17_conyolution2d_11_12×12×32
18: 18_conyolution2d_14_12×12×32
19: 19_conyolution2d_15_12×12×32
20: 20_merge_2_12×12×128
21: 21_conyolution2d_19_12×12×64
22: 22_conyolution2d_17_12×12×64
23: 23_conyolution2d_20_12×12×64
24: 24_ayeragepooling2d_3_6×6×64
25: 25_conyolution2d_16_6×6×64
26: 26_conyolution2d_18_6×6×64
27: 27_conyolution2d_21_6×6×64
28: 28_conyolution2d_22_6×6×64
29: 29_merge_3_6×6×256
30: 30_globlaveragepooling2d_1_1×1×256
31: 31_binary_1×1×2
32: 32_nary_1×1×36

Figure 4:
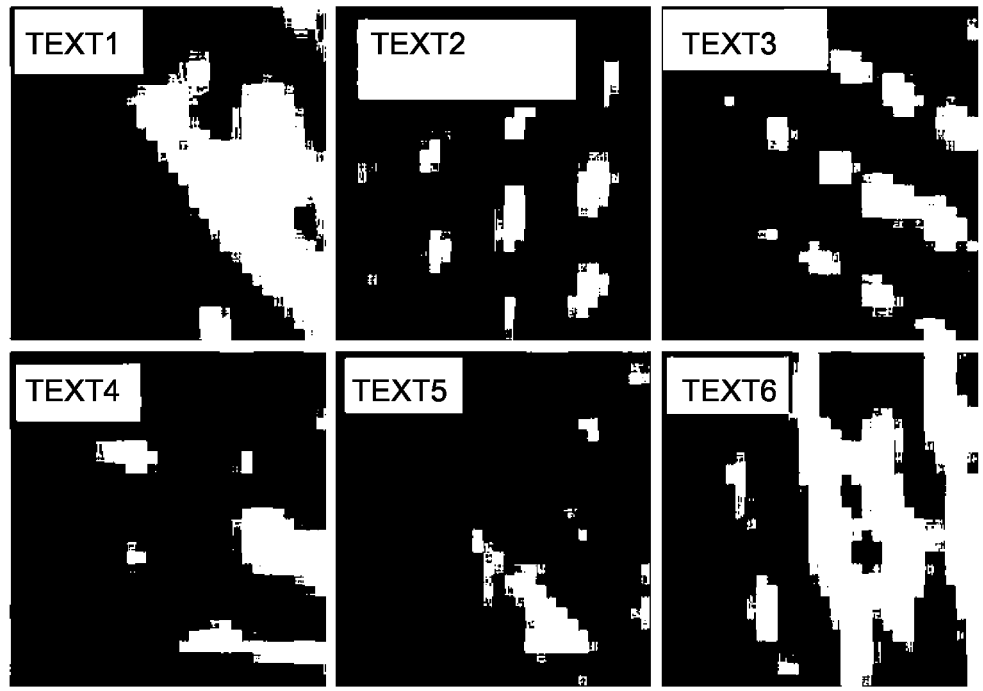
FIG. 4 schematically illustrates examples of images which have been acquired using an image sensor of the textile treatment device as illustrated in FIG. 1.

FIG. 4 shows various examples of sample images of textiles taken by the image sensor 5, and used as input of a CNN stored in the textile treatment device 1 to obtain a classification of the textile. As shown, different textiles have different structure, such as different weaving patterns.

The images which are shown in FIG. 4 result in mutually different classifications determined by the control unit of the textile treatment device:

TEXT1: cotton,
TEXT2: 65% polyester+35% cotton,
TEXT3: nylon,
TEXT4: jeans,
TEXT5: wool,
TEXT6: linen.

Images which are supplied as input to the CNN may correspond to grayscale images. However, it is also possible that color images are similarly used as input for the CNN.

The grayscale or color images of the image sensor may be directly supplied to the convolutional layer of the first stage of the CNN.

However, it is also possible that one or more filters are applied to the images generated by the image sensor, before the images are used as input for the CNN. Examples for such image processing filters include but are not limited to noise reduction, sharpening, gamma correction, softening, lens shading correction, lens deformation correction, lens chromatic aberration correction.

Preferably, the textile treatment device 1 depicted in FIG. 1 includes an additional sensor 34. The additional sensor 34 corresponds to a motion sensor 34, which may be configured as a linear and/or rotary motion sensor. The motion sensor 34 may be a one or more axes motion sensor. The sensor 34 is in signal communication with the control unit 8.

The motion sensor 34 may be configured as an inertial motion sensor. The inertial motion sensor may include an accelerometer and/or a gyroscope.

The sensor output of the motion sensor 34 is representative of at least one motion parameter (e.g., orientation, displacement, velocity, and/or an acceleration). Depending on the sensor output of the motion sensor 34, the control unit 8 may control operation of the heatable soleplate 4 and/or operation of the steam generator 9.

By way of example, the heatable soleplate temperature may be raised at higher velocities and be decreased at a lower velocity.

Thereby, the heatable soleplate temperature may be raised above a fabric specific steady-state temperature (i.e. device is not moving) if sufficient velocity is detected.

Further, in order to avoid damages to the textile, the heatable soleplate temperature may be lowered to a "safe temperature" upon detection of prolonged absence of motion. These aspects will be described in more details in the following along with the flow chart of FIG. 10.

Additionally or alternatively, the control unit 8 uses the output of the motion sensor for controlling the least one operating parameter of the textile treatment device which is also controlled based on the classification of the textile. This allows for a more reliable control of the at least one operating parameter.

Figure 6:
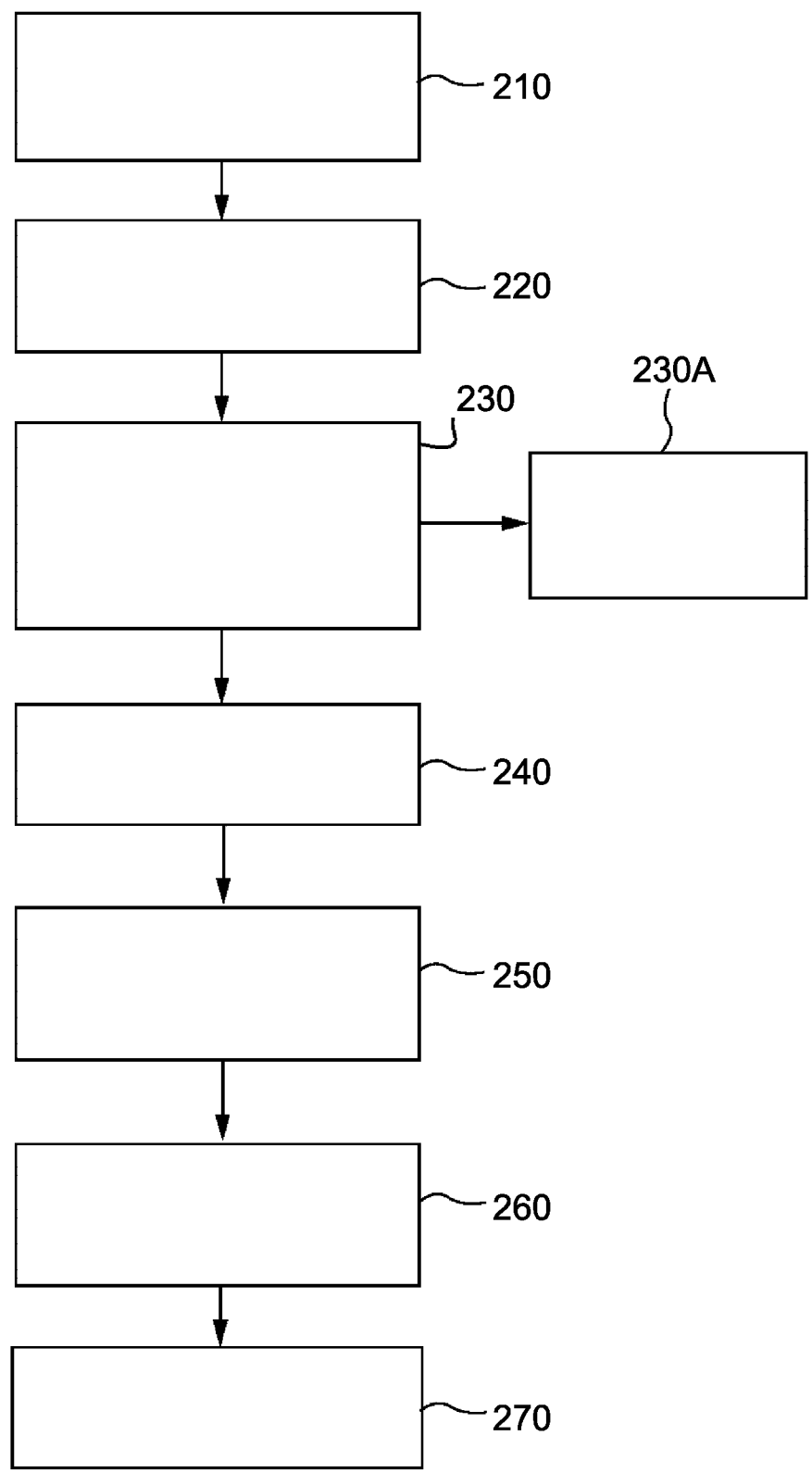
FIG. 6 depicts a first flowchart of a method according to the invention of operating a textile treatment device according to the invention.

FIG. 6 depicts a first flowchart of a method according to the invention of operating a textile treatment device according to the invention.

The textile treatment device corresponds to any textile treatment device described above.

An image of the textile to be treated is taken in step 210 using the image sensor. The image may be taken when the heatable soleplate of the textile treatment device is in planar and heat conductive contact with the textile to be treated.

A control unit, which is integrated within the textile treatment device executes in step 220 an algorithm, which is stored in the textile treatment device, using the image as an input of the algorithm.

The algorithm receives at its input, an image which has been acquired by the image sensor of the textile treatment device. Depending on the image, the control unit determines the classification of the textile by executing the algorithm.

The control unit controls in step 230, based on the obtained classification, at least one operating parameter of the textile treatment device.

The controlling step 230 of the at least one operating parameter may include controlling, using the classification of the textile, for example the temperature of the heatable soleplate 4. Thereby, it is possible to set the temperature of the heatable soleplate so that efficient treatment of the textile in step 230A is ensured and damaging of the textile is reliably avoided.

Additionally or alternatively, the step of controlling 230 the at least one operating parameter may include controlling, using the classification of the textile, an amount of steam to be supplied to the textile. This allows in step 230A an efficient treatment of the textile by using steam and reduces risks of damaging the textile.

As similarly described above, the accuracy and/or robustness of the textile classification can be improved by re-training the algorithm, for example by an external computing system.

In order to allow the external computing system to perform the operations for training again the algorithm, data are transmitted from the textile treatment device to the external computing system using a communication system 22 of the textile treatment device. To this end, data are determined from:
- a user input received in step 240 via an interface 25 of the textile treatment device. The user input is indicative of a user-specified classification of the textile and/or indicative of a characteristic of the textile.
- the image taken by the image sensor which is associated with the user-specified classification.

The data are transmitted in step 250 to the external computing system for re-training/optimizing the algorithm.

The external computing system performs in step 260 the operation for re-training the algorithm, using this data as a new set of training examples.

After the external computing system has completed these operations and that a corresponding new version of the algorithm is created, the textile treatment device receives in step 270 from the external computing system, the new version of the algorithm, in order to replace the algorithm that was initially stored in the textile treatment device by this new version of the algorithm.

The new version of the algorithm defines a computer program product taking the form of an executable file, an executable library, or a downloadable mobile application for mobile phone and/or smartphone. The computer program product contains instruction codes for obtaining a classification of a textile from an image of the textile. The instruction codes defines a convolutional neural network (CNN) having at least one convolutional layer, as described above.

Figure 10:
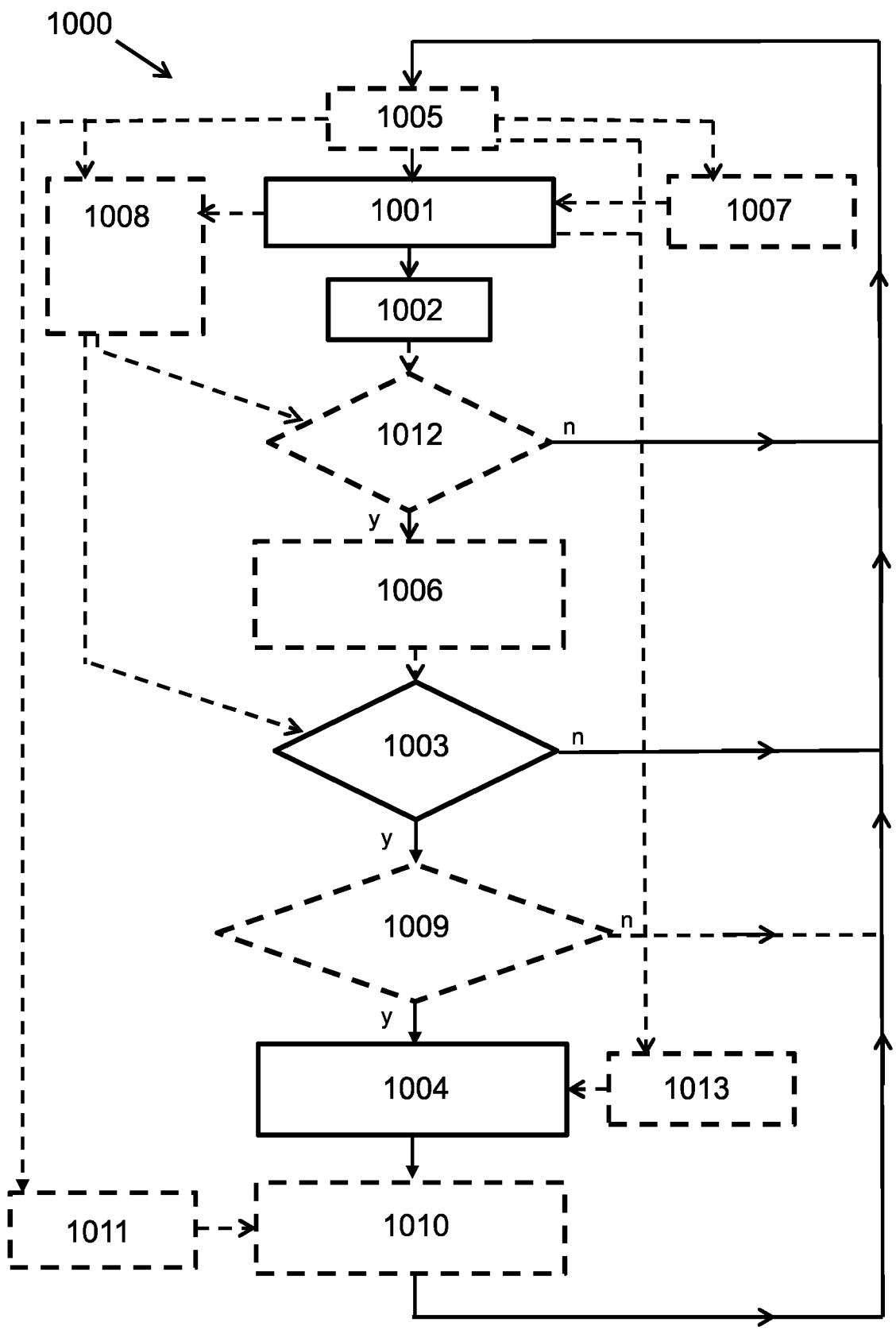
FIG. 10 depicts a second flowchart of a method according to the invention of operating a textile treatment device according to the invention.

FIG. 10 depicts a second flowchart of a method 1000 according to the invention of operating a textile treatment device according to the invention.

In this flow chart, steps/decisions steps represented in dotted lines corresponds to preferred or optional steps/decisions.

This method of treating a textile TXT is applicable to a textile treatment device as previously described along with FIGS. 1, 1a, 1b, 1h and comprising a heatable soleplate 4 intended to be in contact with the textile for treating the textile.

The method comprises:
- a first step 1001 of setting a first temperature target TT1 for the heatable soleplate 4,
- a step 1002 of detecting movement of said textile treatment device.

If the step 1002 of detecting movement did not detect any movement of said textile treatment device during more than a given first time duration D1, which is illustrated by the "y" branch of the decision step 1003, the method performs a step 1004 of actively decreasing the temperature of the heatable soleplate 4 up to reaching a first given temperature T1 having a value below said first temperature target TT1.

By "actively", it is meant that specific and proactive measures are taken to decrease temperature of the heatable soleplate 4. In other words, the decrease of temperature is caused by an active cooling-down of the soleplate temperature, and not by a passive cooling-down caused by the natural thermal exchange (or leakage) of the heatable soleplate 4 with its environment, such as with ambient air and/or contact with the textile.

Those steps improve the safety of the textile treatment device in case the textile treatment device would keep still, without any movement, for more than a given duration D1. By detecting this situation, the soleplate temperature is cooled down to avoid a too long contact between the soleplate and the textile (or garment) that might otherwise result in damaging the textile and/or creating risks of fire.

In particular, this method proves its efficiency in the situation where the temperature of the soleplate is set to a relatively higher temperature compared to nominal ironing temperature, considering the type of textile being treated, in particular textile classified as delicate, in order to have an even more efficient result of the ironing/steaming. Under such circumstances, it becomes crucial that safety measures are taken to actively and quickly cool-down the temperature of the soleplate if the textile treatment device is already without movement during more than a duration threshold D1 above which textile/garment would be damaged.

It is noted that "temperature target" refers to the desired soleplate temperature to be reached, by regulating electrical power provided to the soleplate in order to reach this targeted value of the soleplate temperature. Because soleplates have usually relative high thermal mass, reaching the temperature target is not instantaneous and may take a certain duration. In the flow chart of the method according to the invention, a step of setting the soleplate temperature to a given temperature target does not mean that at the exit of this step, the temperature target has been reached already.

If the step 1002 of detecting movement did detect some movement of said textile treatment device before the end of the given first time duration D1, which is illustrated by the "n" branch of the decision step 1003, the method returns to performing the first step 1001 of setting a first temperature target TT1 for the heatable soleplate 4.

By no movement, it is referred to a movement below a certain movement threshold, the movement threshold including a zero value.

For example, the first time duration D1 is in the range from a few seconds to a few minutes, preferably 30-90 seconds, preferably 60 seconds.

For example, the first temperature target TT1 is in the range 100-220 degresC.

For example, the first temperature target TT1 is in the range 100-220 degree Celsius.

For example, the first given temperature T1 is in the range 120-170 degresC, preferably in the range 140-150 degree Celsius.

Preferably, the temperature of soleplate is measured according to Standard IEC 60311.

It is noted that the first step 1001 can be done before the step 1002, or that the step 1002 can be done before the first step 1001.

Preferably, the method further comprises a step 1005 of detecting a classification of the textile being treated, wherein said classification is defined as:
  a fabric type of the textile, or
  a fabric level of delicateness for treating the textile.

This step 1005 is similar as the classification detection previously described along with the description. It is preferably performed before the first step 1001 of setting a first temperature target TT1 for the heatable soleplate 4.

Preferably, if the step 1002 of detecting movement did not detect any movement of said textile treatment device during more than a given second time duration D2, said second time duration D2 being less than said first time duration D1, which is illustrated by the "y" branch of the decision step 1012, the method performs a second step 1006 of setting a second temperature target TT2 for the heatable soleplate 4, said second temperature target TT2 being less than said first temperature target TT1.

This second step 1006 of setting a second temperature target TT2 for the heatable soleplate 4 constitutes an additional safety measure. Indeed, by setting the temperature target of the soleplate to a lower value compared to the first temperature target TT1, the soleplate will start to passively cool-down by natural thermal exchange (or leakage) of the heatable soleplate 4 with its environment, such as with ambient air and/or contact with the textile. Under this circumstances, and if at the end the textile treatment device remains without any movement up to reaching the first time duration D1, the step 1004 of actively decreasing the temperature of the heatable soleplate 4 could be done quicker, considering that when the step 1004 is performed, the soleplate temperature has already decreased passively before.

If the step 1002 of detecting movement did detect some movement of said textile treatment device before the end of the given second time duration D2, which is illustrated by the "n" branch of the decision step 1012, the method returns to performing the first step 1001 of setting a first temperature target TT1 for the heatable soleplate 4.

For example, the second time duration D2 is in the range from a few hundreds of milliseconds to a few tens of seconds, preferably 5-20 seconds, preferably 10 seconds.

It is noted that if the second time duration D2 is in the order of a few hundreds of milliseconds, this means that the step 1006 of setting a second temperature target TT2 for the heatable soleplate 4 is triggered almost instantaneously.

Preferably, the method comprises a step 1007 of associating a value to said first temperature target TT1 depending on said classification.

Preferably, the value of said first temperature target TT1 for the heatable soleplate 4 is as follows:

in the range 100-180 degree Celsius, preferably 160 to 180 degree Celsius, if the fabric level of delicateness is classified as delicate,
  in the range 181-220 degree Celsius, preferably 190-210 degree Celsius, if the fabric level of delicateness is classified as tough.

Preferably, the method comprises a step 1013 of associating a value to said first given temperature T1 depending on said classification and said first temperature target TT1, for example as follows:

in the range 120-150 degree Celsius, preferably 140-150 degree Celsius, if the fabric level of delicateness is classified as delicate, and the first temperature target TT1 is in the range 160-180 degree Celsius,
  in the range 140-170 degree Celsius, preferably 160-170 degree Celsius, if the fabric level of delicateness is classified as tough, and the first temperature target TT1 is in the range 181-220 degree Celsius.

Preferably, the method further comprises a step 1008 of associating a value to said first time duration D1 and/or said second time duration D2, depending on said first temperature target TT1 and/or said classification.

Since a preferred requirement is that the textile has to resist to heat without damage if the textile treatment device is not moving during this time duration D1 and/or D2, this requirement is more easily fulfilled if value of D1 and/or D2 are determined based on the first temperature target TT1 and/or said classification.

A delicate fabric can resist to heat damage for a longer time duration if the soleplate temperature is lower, and a tough fabric can resist to heat damage for a longer time duration if the soleplate temperature is higher.

For a given classification of textile, this textile can resist to heat damage for a time duration that depends on a maximum soleplate temperature, and this maximum soleplate temperature is relatively lower if dealing with a delicate fabric and relatively higher if dealing with a tough fabric.

Preferably, the step 1004 of actively decreasing the temperature of the heatable soleplate 4 is performed only if the temperature of the heatable soleplate 4 is above said first given temperature T1. This is illustrated by the "y" branch of the decision step 1009.

The reason for having this step is that at the end of the total duration D1 where the textile treatment device is not moving, the heatable soleplate 4 passively lost sufficient thermal energy by thermal exchange (or leakage) of the heatable soleplate 4 with its environment, such as with ambient air and/or contact with the textile. In that case, the temperature of the soleplate reached at the end of the total duration D1 is sufficiently low for not performing e step 1004 of actively decreasing the temperature of the heatable soleplate 4. This is illustrated by the "n" branch of the decision step 1009.

Preferably, the step 1004 of actively decreasing the temperature of the heatable soleplate 4 comprising injecting an amount of water in a steam chamber 10 being in thermal contact with said heatable soleplate 4.

Injecting an amount of water in a steam chamber 10 constitutes a fast and effective way to actively cool-down temperature of the heatable soleplate 4. By introducing water into the steam chamber of the soleplate, the latent heat of vaporization of water is utilized to lower the temperature of the soleplate, when the water turns into steam.

Moreover, this approach allows to re-use hardware feature of the textile treatment device, namely the steam chamber 10, that is used in other circumstances for generating steam over the textile, so is a cost-effective approach.

Preferably, injecting an amount of water in said steam chamber 10 comprises injecting water with a continuous flow rate.

Preferably, continuous flow rate has a value between 4-25 g/mn, preferably 15 g/mn.

Preferably, injecting an amount of water in said steam chamber 10 comprises injecting water with different successive flow rates.

Preferably, the different successive flow rates comprise a first flow rate in the range 2-10 g/mn during a first time duration in the range 20-60 seconds, followed by a second flow rate in the range 5-25 g/mn during a second time duration in the range 10-40 seconds.

The value of those ranges for the water flow, either continuous or consecutive, is an optimal compromise between:
too little amount of water introduced in the steam chamber that would not allow a sufficient fast decrease of the soleplate temperature, which in turn might damage the textile,
too high amount of water introduced in the steam chamber which would for sure allow a fast decrease of the soleplate temperature, but would create a non-friendly user experience by lot of steam being generated around the textile treatment device, and might also result in an harmful fast calcification of the steam chamber.

The amount of water injected in the steam chamber depends on the mass and temperature of the soleplate, since during the active decrease of soleplate temperature, the power to soleplate is preferably interrupted.

The amount of water used for actively decreasing the soleplate temperature depends on the mass of the soleplate, the initial temperature TT1 of the soleplate, and the desired final temperature T1 of the soleplate. Those parameters allow to determine the heat energy needed to be removed through water evaporation by the soleplate. Typically, the soleplate has a mass between 0.3 kg to 0.6 kg.

Preferably, the method further comprises a step 1010 of passively decreasing the temperature of the heatable soleplate 4 up to reaching a second given temperature T2 having a value less than said first given temperature T1.

This step is advantageous to counter situation where a rebound in soleplate temperature at the end of active cooling could happen due to local heat concentration or uneven temperature distribution in the soleplate.

Preferably, the method further comprising a step 1011 of associating a value to said second temperature T2, said value depending on said classification.

Preferably, the value of said second temperature T2 is in the range 105-145 degree Celsius if the fabric level of delicateness is classified as delicate, and in the range 125-165 degree Celsius if the fabric level of delicateness is classified as tough.

The invention also relates to a computer program product taking the form of an executable file, or an executable library, or a downloadable mobile application for mobile phone and/or smartphone, the computer program product containing instruction codes for implementing the method described above along with FIG. 10.

The various steps of the method 1000 according to the invention can be implemented in a textile treatment device as depicted in FIGS. 9A, 9B, 9C, 9D and comprising means for actively decreasing the temperature of the heatable soleplate 4.

In addition to already provided description along with FIGS. 9A, 9B, 9C, 9D, the control unit 8 is adapted to trigger said means for actively decreasing the temperature of the heatable soleplate 4 if the motion sensor 34 did not detect any movement of said textile treatment device during more than a given first time duration D1, for actively decreasing the temperature of the heatable soleplate 4 up to reaching a first given temperature T1 having a value below said first temperature target TT1.

The value and range for T1 and TT1 have been described previously along with the method 1000 according to the invention.

Preferably, the means for actively decreasing the temperature of the heatable soleplate 4 comprise:
the steam chamber 10 being in thermal contact with the heatable soleplate 4,
the water supply 9a,
a pump P2 controllable by the control unit 8, for pumping water from said water supply 9a into said steam chamber 10.

The pumping of water by the pump P2 is done with a continuous flow rate or successive different flow rates as described above.

Preferably, the textile treatment device also comprises a one-way valve OV1 arranged between said water supply 9a and said steam chamber 10, in order to prevent back flow of steam when water is injected in said steam chamber 10.

It is noted that this one-way valve OV1 could also be integrated within the pump P2.

Above-described means for actively decreasing the temperature of the heatable soleplate 4 implemented in a textile treatment device as depicted in FIG. 1 can also be implemented similarly in the textile treatment devices as previously described along with in 1a, 1b, 1h.

Although the invention has been described on the basis of using squared images taken by the image sensor, the invention applies similarly if non-squared images are used, such as rectangular images.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the protective scope of the claims of the present invention. In particular, where the invention has been described based on an ironing device, it can be applied to any textile treatment device, such as a garment steamer. In the claims, the word "comprising" does not exclude other elements or steps, and the indefinite article "a" or "an" does not exclude a plurality. Any reference signs in the claims should not be construed as limiting the scope.

The invention claimed is:
1. A method of operating a textile treatment device comprising a heatable soleplate intended to be in contact with a textile for treating the textile, the method comprising:
detecting a classification of the textile being treated, the classification being defined as at least one of a fabric type of the textile or a fabric level of delicateness for treating the textile;
setting a first temperature target for the heatable soleplate;
detecting movement of said textile treatment device; and
when no movement of said textile treatment device is detected during more than a given first time duration, actively decreasing a temperature of the heatable sole- plate, more quickly than natural thermal leakage, to a first given temperature having a value below said first temperature target.

2. The method according to claim 1, further comprising: when no movement of said textile treatment device is detected during more than a given second time duration, said second time duration being less than said first time duration, setting a second temperature target for the heatable soleplate, said second temperature target being less than said first temperature target.

3. The method according to claim 1, further comprising associating a value to said first temperature target depending on said classification.

4. The method according to claim 1, further comprising associating a value to said first given temperature depending on said classification and said first temperature target.

5. The method according to claim 1, further comprising associating a value to said first time duration, depending on at least one of the first temperature target or the classification.

6. The method according to claim 1, wherein actively decreasing the temperature of the heatable soleplate is performed only when the temperature of the heatable soleplate is above said first given temperature.

7. The method according to claim 1, wherein actively decreasing the temperature of the heatable soleplate comprises injecting an amount of water in a steam chamber being in thermal contact with said heatable soleplate.

8. The method according to claim 7, wherein injecting the amount of water in said steam chamber comprises injecting water with a continuous flow rate.

9. The method according to claim 8, wherein said continuous flow rate has a value between 4-25 g/mn.

10. The method according to claim 7, wherein injecting the amount of water in said steam chamber comprises injecting water with different successive flow rates.

11. The method according to claim 10, wherein said different successive flow rates comprise a first flow rate in a range of 2-10 g/mn for about 20-60 seconds, followed by a second flow rate in a range of 5-25 g/mn for about 10-40 seconds.

12. The method according to claim 1, further comprising passively decreasing the temperature of the heatable soleplate up to reaching a second given temperature having a value less than said first given temperature.

13. The method according to claim 12, further comprising associating a value to said second given temperature depending on said classification.

14. A textile treatment device for treating a textile, the textile treatment device comprising:
a heatable soleplate configured to be in contact with the textile for treating the textile;
a motion sensor configured to detect movement of said textile treatment device;
means for actively decreasing a temperature of the heatable soleplate;
an image sensor configured to take an image of the textile to be treated; and
a control unit configured to execute instructions causing the control unit to:
trigger said means for actively decreasing the temperature of the heatable soleplate when the motion sensor does not detect movement of said textile treatment device during more than a given first time duration, in order to actively, decrease the temperature of the heatable soleplate, more quickly than natural thermal leakage, to a first given temperature having a value below a first temperature target; and
obtain a classification of the textile using the image taken by the image sensor, wherein the classification is defined as at least one of a fabric type of the textile or a fabric level of delicateness for treating the textile.

15. The textile treatment device according to claim 14, wherein said means for actively decreasing the temperature of the heatable soleplate comprise a steam chamber in thermal contact with said heatable soleplate, a water supply, and a pump controllable by said control unit for pumping water from said water supply into said steam chamber.

16. The textile treatment device according to claim 15, further comprising a one-way valve arranged between said water supply and said steam chamber, to prevent back flow of steam when water is injected in said steam chamber.

17. The textile treatment device according to claim 14, wherein the textile treatment device is one of a pressurized steam ironing system comprising a base and a boiler in the base or outside the base, a steam ironing device, or a stand garment steamer comprising a steam chamber in a steamer head and a boiler in a base.

18. The textile treatment device according to claim 14, wherein a value of the given first temperature target is based on the classification.

19. The textile treatment device according to claim 14, wherein a value of the given first time duration is based on the classification.

20. A textile treatment device for treating a textile, the textile treatment device comprising:
a heatable soleplate configured to be in contact with the textile for treating the textile;
a motion sensor configured to detect movement of the textile treatment device;
means for actively decreasing a temperature of the heatable soleplate;
an image sensor configured to take an image of the textile to be treated; and
a control unit configured to execute instructions causing the control unit to:
set a first temperature target for the heatable soleplate;
trigger the means for actively decreasing the temperature of the heatable soleplate when the motion sensor does not detect movement of the textile treatment device during more than a given first time duration, in order to actively decrease the temperature of the heatable soleplate, more quickly than natural thermal leakage, to a first given temperature having a value below the first temperature target; and
set a second temperature target for the heatable soleplate when the motion sensor does not detect movement of the textile treatment device during more than a given second time duration less than the first time duration, wherein the second temperature target is less than the first temperature target.

* * * * *